(12) United States Patent
Lee et al.

(10) Patent No.: US 12,535,656 B2
(45) Date of Patent: Jan. 27, 2026

(54) INFRARED PROJECTION LENS ASSEMBLY AND INFRARED PROJECTION MODULE

(71) Applicant: NEWMAX TECHNOLOGY CO., LTD., Taichung (TW)

(72) Inventors: Chun-Sheng Lee, Taichung (TW); Chi-Chang Wang, Taichung (TW); Ya-Hsin Huang, Taichung (TW)

( * ) Notice: Subject to any disclaimer, the term of this patent is extended or adjusted under 35 U.S.C. 154(b) by 478 days.

(21) Appl. No.: 17/504,494

(22) Filed: Oct. 18, 2021

(65) Prior Publication Data
US 2023/0052783 A1   Feb. 16, 2023

(30) Foreign Application Priority Data

Jul. 30, 2021   (TW) ................. 110128051

(51) Int. Cl.
| | |
|---|---|
| *G02B 13/14* | (2006.01) |
| *G02B 9/12* | (2006.01) |
| *G02B 13/00* | (2006.01) |
| *G02B 13/18* | (2006.01) |
| *G02B 27/00* | (2006.01) |

(52) U.S. Cl.
CPC .......... *G02B 13/0035* (2013.01); *G02B 9/12* (2013.01); *G02B 13/14* (2013.01); *G02B 27/0025* (2013.01)

(58) Field of Classification Search
CPC .............. G02B 9/00; G02B 9/12; G02B 9/14; G02B 9/16; G02B 13/00; G02B 13/001; G02B 13/0015; G02B 13/002; G02B 13/0035; G02B 13/008; G02B 13/14; G02B 13/146; G02B 13/18; G02B 27/0025
USPC ................ 359/350–361, 648–651, 716, 754, 359/784–785
See application file for complete search history.

(56) References Cited

U.S. PATENT DOCUMENTS

| | | | | |
|---|---|---|---|---|
| 6,128,120 | A * | 10/2000 | Mushiake | G02B 26/105 359/212.1 |
| 8,570,667 | B2 * | 10/2013 | Hsu | G02B 13/18 359/716 |
| 9,110,238 | B2 * | 8/2015 | Nakahara | H04N 23/63 |
| 9,753,246 | B2 * | 9/2017 | Matsuo | H04N 23/62 |
| 2009/0179142 | A1 * | 7/2009 | Duparre | H01L 27/14605 438/69 |

* cited by examiner

*Primary Examiner* — Thong Q Nguyen
(74) *Attorney, Agent, or Firm* — Bruce Stone LLP; Joseph A. Bruce

(57) ABSTRACT

An infrared projection lens assembly includes, in order from the image side to the image source side: a stop, a first lens with positive refractive power, a second lens with refractive power, and a third lens with positive refractive power, wherein a radius of curvature of an image-side surface of the first lens is R1, half of a maximum view angle (field of view) of the infrared projection lens assembly is HFOV, a focal length of the infrared projection lens assembly is f, and following condition is satisfied: −18.2<R1/(sin(HFOV)*f) <−1.53, so as to provide projected light of large angle.

20 Claims, 19 Drawing Sheets

INFRARED PROJECTION LENS ASSEMBLY AND INFRARED PROJECTION MODULE

BACKGROUND

Field of the Invention

The present invention relates to an infrared projection lens assembly and infrared projection module, and more particularly to an infrared projection lens assembly and infrared projection module applicable to electronic products.

Description of Related Art

Nowadays digital imaging technology is constantly innovating and changing, in particular, digital carriers, such as, notebook, tablet computer, mobile phone and so on, have become smaller in size, so CCD (Charge Coupled Device) or CMOS (Complementary Metal Oxide Semiconductor) sensor is also required to be more compact. In addition to be used in the field of photography, in recent years, infrared focusing lens has also be used in infrared receiving and sensing field of the digital carriers, such as, notebook, tablet computer, mobile phone and so on, and in order to make the scope of game machine induction user more broader, wide-angle lens group has become the mainstream for receiving infrared wavelength at present.

At present, the digital carrier is based on a more three-dimensional, real and immediate 3D use. However, the 3D projection angle (field of view) of the digital carrier is small, which cannot meet the needs of a wider induction range of users.

The present invention mitigates and/or obviates the aforementioned disadvantages.

SUMMARY

The primary objective of the present invention is to provide an infrared projection lens assembly and infrared projection module. When a specific condition is satisfied, the infrared projection lens assembly of the present invention can provide a large-angle projection light.

Therefore, an infrared projection lens assembly in accordance with the present invention comprises, in order from an image side to an image source side: a stop; a first lens with positive refractive power, comprising an image-side surface and an image source-side surface, the image-side surface of the first lens being concave near an optical axis and the image source-side surface of the first lens being convex near the optical axis, and the image-side surface and the image source-side surface of the first lens being aspheric; a second lens with refractive power, comprising an image-side surface and an image source-side surface, the image-side surface of the second lens being concave near the optical axis and the image source-side surface of the second lens being convex near the optical axis, and the image-side surface and the image source-side surface of the second lens being aspheric; a third lens with positive refractive power, comprising an image-side surface and an image source-side surface, the image-side surface of the third lens being convex near the optical axis and the image source-side surface of the third lens being convex near the optical axis, and the image-side surface and the image source-side surface of the third lens being aspheric.

Wherein a radius of curvature of the image-side surface of the first lens is R1, half of a maximum view angle (field of view) of the infrared projection lens assembly is HFOV, a focal length of the infrared projection lens assembly is f, and following condition is satisfied: $-18.2 < R1/(\sin(HFOV)*f) < -1.53$.

Preferably, the infrared projection lens assembly has a total of three lenses with refractive power.

The present invention has the following effect: if the above three lenses with refractive power satisfy the condition $-18.2 < R1/(\sin(HFOV)*f) < -1.53$, it can provide a large-angle projection light. Preferably, following condition can be satisfied: $-7.75 < R1/(\sin(HFOV)*f) < -1.70$.

Preferably, the infrared projection lens assembly has the maximum view angle (field of view) FOV, the focal length of the infrared projection lens assembly is f, and following condition is satisfied: $22.93°/mm < FOV/f < 94.42°/mm$, which can provide a large-angle projection light. Preferably, following condition can be satisfied: $22.93°/mm < FOV/f < 34.91°/mm$ or $49.27°/mm < FOV/f < 94.42°/mm$.

Preferably, a radius of curvature of the image source-side surface of the first lens is R2, a radius of curvature of the image-side surface of the second lens is R3, and following condition is satisfied: $1.05 < R2/R3 < 3.54$, which can reduce the spherical aberration and astigmatism of the infrared projection lens assembly effectively. Preferably, following condition can be satisfied: $1.79 < R2/R3 < 3.54$ or $1.05 < R2/R3 < 3.14$.

Preferably, the radius of curvature of the image-side surface of the first lens is R1, a radius of curvature of the image-side surface of the third lens is R5, and following condition is satisfied: $-8.26 < R1/R5 < -0.20$, which can reduce the spherical aberration and astigmatism of the infrared projection lens assembly effectively. Preferably, following condition can be satisfied: $-3.30 < R1/R5 < -0.63$.

Preferably, the radius of curvature of the image-side surface of the first lens is R1, an entrance pupil diameter of the infrared projection lens assembly is EPD, and following condition is satisfied: $-14.34 < R1/EPD < -1.88$, so that the curvature of the image-side surface of the first lens can enhance its wide-angle property, so as to provide a large light exit angle and maintain the projection quality of the lens assembly. Preferably, following condition can be satisfied: $-12.09 < R1/EPD < -2.10$.

Preferably, the radius of curvature of the image-side surface of the third lens is R5, the entrance pupil diameter of the infrared projection lens assembly is EPD, and following condition is satisfied: $1.39 < R5/EPD < 11.95$, so that the curvature of the image-side surface of the third lens can adjust the light exit angle of the main light, so as to provide better projection quality. Preferably, following condition can be satisfied: $1.90 < R5/EPD < 4.39$.

Preferably, the radius of curvature of the image-side surface of the first lens is R1, a distance from the image-side surface of the first lens to an image plane along the optical axis is TL, the focal length of the infrared projection lens assembly is f, and following condition is satisfied: $-28.34 \text{ mm} < R1(TL/f) < -2.80 \text{ mm}$, which is favorable to the balance between miniaturization and image quality. Preferably, following condition can be satisfied: $-28.34 \text{ mm} < R1(TL/f) < -6.19 \text{ mm}$ or $-26.69 \text{ mm} < R1(TL/f) < -2.80 \text{ mm}$.

Preferably, a focal length of the second lens is f2, a focal length of the third lens is f3, and following condition is satisfied: $-25.66 < f2/f3 < 11.31$, wherein the ratio f2/f3 must not be equal to zero, so that the distribution of the refractive power of the lens assembly will be appropriate, it will be favorable to correct the aberration and improve the image quality of the lens assembly. Preferably, following condition can be satisfied: $-25.66 < f2/f3 < -3.33$ or $-4.68 < f2/f3 < 11.31$, wherein the ratio f2/f3 must not be equal to zero.

Preferably, the focal length of the third lens is f3, the entrance pupil diameter of the infrared projection lens assembly is EPD, and following condition is satisfied: $1.45<f3/EPD<6.42$, so as to balance the relationship between the focal length of the third lens and the entrance pupil diameter. Preferably, following condition can be satisfied: $3.14<f3/EPD<6.09$.

Preferably, a distance from the image-side surface of the first lens to the image source-side surface of the third lens along the optical axis is TD, the focal length of the infrared projection lens assembly is f, and following condition is satisfied: $1.16<TD/f<2.29$, which is favorable to achieve an appropriate balance between miniaturization and the focal length of the infrared projection lens assembly. Preferably, following condition can be satisfied: $1.16<TD/f<2.07$ or $1.35<TD/f<2.29$.

Preferably, the focal length of the second lens is f2, a central thickness of the second lens along the optical axis is CT2, and following condition is satisfied: $-143.51<f2/CT2<69.94$, wherein the ratio f2/CT2 must not be equal to zero, so as to balance the relationship between the thickness and the focal length of the second lens. Preferably, following condition can be satisfied: $-143.51<f2/CT2<-17.25$ or $-25.15<f2/CT2<69.94$, wherein the ratio f2/CT2 must not be equal to zero.

Preferably, a central thickness of the first lens along the optical axis is CT1, the central thickness of the second lens along the optical axis is CT2, and following condition is satisfied: $0.47<CT1/CT2<1.85$, so that the thicknesses of the first lens and the second lens can be balanced, which is favorable to achieve a proper balance between miniaturization and the lens formability. Preferably, following condition can be satisfied: $0.47<CT1/CT2<1.37$ or $0.73<CT1/CT2<1.85$.

Preferably, a central thickness of the third lens along the optical axis is CT3, the central thickness of the second lens along the optical axis is CT2, and following condition is satisfied: $0.79<CT3/CT2<2.83$, so that the thicknesses of the second lens and the third lens can be balanced, which is favorable to achieve a proper balance between miniaturization and the lens formability. Preferably, following condition can be satisfied: $0.88<CT3/CT2<1.85$.

Preferably, the distance from the image-side surface of the first lens to the image source-side surface of the third lens along the optical axis is TD, a distance from the image source-side surface of the second lens to the image-side surface of the third lens along the optical axis is T23, and following condition is satisfied: $44.10<TD/T23<147.24$, which is favorable to achieve an appropriate balance between miniaturization and lens spacing. Preferably, following condition can be satisfied: $67.51<TD/T23<147.24$ or $44.10<TD/T23<53.90$.

An infrared projection module in accordance with the present invention comprises a lens barrel, an infrared projection lens assembly disposed in the lens barrel, and a light source disposed on an image source plane of the infrared projection lens assembly.

The infrared projection lens assembly comprises, in order from an image side to an image source side: a stop; a first lens with positive refractive power, comprising an image-side surface and an image source-side surface, the image-side surface of the first lens being concave near an optical axis and the image source-side surface of the first lens being convex near the optical axis, and the image-side surface and the image source-side surface of the first lens being aspheric; a second lens with refractive power, comprising an image-side surface and an image source-side surface, the image-side surface of the second lens being concave near the optical axis and the image source-side surface of the second lens being convex near the optical axis, and the image-side surface and the image source-side surface of the second lens being aspheric; a third lens with positive refractive power, comprising an image-side surface and an image source-side surface, the image-side surface of the third lens being convex near the optical axis and the image source-side surface of the third lens being convex near the optical axis, and the image-side surface and the image source-side surface of the third lens being aspheric.

Wherein a radius of curvature of the image-side surface of the first lens is R1, half of a maximum view angle (field of view) of the infrared projection lens assembly is HFOV, a focal length of the infrared projection lens assembly is f, and following condition is satisfied: $-18.2<R1/(sin(HFOV)*f)<-1.53$.

Preferably, the infrared projection lens assembly has a total of three lenses with refractive power.

The present invention has the following effect: if the above three lenses with refractive power satisfy the condition $-18.2<R1/(sin(HFOV)*f)<-1.53$, it can provide a large-angle projection light. Preferably, following condition can be satisfied: $-7.75<R1/(sin(HFOV)*f)<-1.70$.

Preferably, the infrared projection lens assembly has the maximum view angle (field of view) FOV, the focal length of the infrared projection lens assembly is f, and following condition is satisfied: $22.93°/mm<FOV/f<94.42°/mm$, which can provide a large-angle projection light. Preferably, following condition can be satisfied: $22.93°/mm<FOV/f<34.91°/mm$ or $49.27°/mm<FOV/f<94.42°/mm$.

Preferably, a radius of curvature of the image source-side surface of the first lens is R2, a radius of curvature of the image-side surface of the second lens is R3, and following condition is satisfied: $1.05<R2/R3<3.54$, which can reduce the spherical aberration and astigmatism of the infrared projection lens assembly effectively. Preferably, following condition can be satisfied: $1.79<R2/R3<3.54$ or $1.05<R2/R3<3.14$.

Preferably, the radius of curvature of the image-side surface of the first lens is R1, a radius of curvature of the image-side surface of the third lens is R5, and following condition is satisfied: $-8.26<R1/R5<-0.20$, which can reduce the spherical aberration and astigmatism of the infrared projection lens assembly effectively. Preferably, following condition can be satisfied: $-3.30<R1/R5<-0.63$.

Preferably, the radius of curvature of the image-side surface of the first lens is R1, an entrance pupil diameter of the infrared projection lens assembly is EPD, and following condition is satisfied: $-14.34<R1/EPD<-1.88$, so that the curvature of the image-side surface of the first lens can enhance its wide-angle property, so as to provide a large light exit angle and maintain the projection quality of the lens assembly. Preferably, following condition can be satisfied: $-12.09<R1/EPD<-2.10$.

Preferably, the radius of curvature of the image-side surface of the third lens is R5, the entrance pupil diameter of the infrared projection lens assembly is EPD, and following condition is satisfied: $1.39<R5/EPD<11.95$, so that the curvature of the image-side surface of the third lens can adjust the light exit angle of the main light, so as to provide better projection quality. Preferably, following condition can be satisfied: $1.90<R5/EPD<4.39$.

Preferably, the radius of curvature of the image-side surface of the first lens is R1, a distance from the image-side surface of the first lens to an image plane along the optical axis is TL, the focal length of the infrared projection lens assembly is f, and following condition is satisfied: −28.34 mm<R1(TL/f)<−2.80 mm, which is favorable to the balance between miniaturization and image quality. Preferably, following condition can be satisfied: −28.34 mm<R1(TL/f)<−6.19 mm or −26.69 mm <R1(TL/f)<−2.80 mm.

Preferably, a focal length of the second lens is f2, a focal length of the third lens is f3, and following condition is satisfied: −25.66<f2/f3<11.31, wherein the ratio f2/f3 must not be equal to zero, so that the distribution of the refractive power of the lens assembly will be appropriate, it will be favorable to correct the aberration and improve the image quality of the lens assembly. Preferably, following condition can be satisfied: −25.66<f2/f3<−3.33 or −4.68<f2/f3<11.31, wherein the ratio f2/f3 must not be equal to zero.

Preferably, the focal length of the third lens is f3, the entrance pupil diameter of the infrared projection lens assembly is EPD, and following condition is satisfied: 1.45<f3/EPD <6.42, so as to balance the relationship between the focal length of the third lens and the entrance pupil diameter. Preferably, following condition can be satisfied: 3.14<f3/EPD <6.09.

Preferably, a distance from the image-side surface of the first lens to the image source-side surface of the third lens along the optical axis is TD, the focal length of the infrared projection lens assembly is f, and following condition is satisfied: 1.16<TD/f<2.29, which is favorable to achieve an appropriate balance between miniaturization and the focal length of the infrared projection lens assembly. Preferably, following condition can be satisfied: 1.16<TD/f<2.07 or 1.35<TD/f<2.29.

Preferably, the focal length of the second lens is f2, a central thickness of the second lens along the optical axis is CT2, and following condition is satisfied: −143.51<f2/CT2<69.94, wherein the ratio f2/CT2 must not be equal to zero, so as to balance the relationship between the thickness and the focal length of the second lens. Preferably, following condition can be satisfied: −143.51<f2/CT2<−17.25 or −25.15<f2/CT2<69.94, wherein the ratio f2/CT2 must not be equal to zero.

Preferably, a central thickness of the first lens along the optical axis is CT1, the central thickness of the second lens along the optical axis is CT2, and following condition is satisfied: 0.47<CT1/CT2<1.85, so that the thicknesses of the first lens and the second lens can be balanced, which is favorable to achieve a proper balance between miniaturization and the lens formability. Preferably, following condition can be satisfied: 0.47<CT1/CT2<1.37 or 0.73<CT1/CT2<1.85.

Preferably, a central thickness of the third lens along the optical axis is CT3, the central thickness of the second lens along the optical axis is CT2, and following condition is satisfied: 0.79<CT3/CT2<2.83, so that the thicknesses of the second lens and the third lens can be balanced, which is favorable to achieve a proper balance between miniaturization and the lens formability. Preferably, following condition can be satisfied: 0.88<CT3/CT2<1.85.

Preferably, the distance from the image-side surface of the first lens to the image source-side surface of the third lens along the optical axis is TD, a distance from the image source-side surface of the second lens to the image-side surface of the third lens along the optical axis is T23, and following condition is satisfied: 44.10<TD/T23<147.24, which is favorable to achieve an appropriate balance between miniaturization and lens spacing. Preferably, following condition can be satisfied: 67.51<TD/T23<147.24 or 44.10<TD/T23<53.90.

For each of the above infrared projection lens assemblies or the infrared projection modules, wherein the focal length of the infrared projection lens assembly is f, and following condition is satisfied: 0.77 mm<f<3.06 mm. Preferably, following condition can be satisfied: 2.02 mm<f<3.06 mm or 0.77 mm <f<1.53 mm.

For each of the above infrared projection lens assemblies or the infrared projection modules, wherein a f-number of the infrared projection lens assembly is Fno, and following condition is satisfied: 1.02<Fno <3.13. Preferably, following condition can be satisfied: 1.65<Fno <3.13 or 1.02<Fno <2.53.

For each of the above infrared projection lens assemblies or the infrared projection modules, wherein the infrared projection lens assembly has the maximum view angle FOV, and following condition is satisfied: 58.48 degrees <FOV <97.20 degrees. Preferably, following condition can be satisfied: 55.48 degrees <FOV <88.29 degrees or 60.78 degrees <FOV <97.20 degrees.

For each of the above infrared projection lens assemblies or the infrared projection modules, wherein the entrance pupil diameter of the infrared projection lens assembly is EPD, and following condition is satisfied: 0.48 mm<EPD <1.47 mm. Preferably, following condition can be satisfied: 0.78 mm<EPD <1.47 mm or 0.48 mm<EPD <0.90 mm.

For each of the above infrared projection lens assemblies or the infrared projection modules, wherein a focal length of the first lens is f1, the focal length of the second lens is f2, and following condition is satisfied: −0.31<f1/f2<0.52, so that the distribution of the refractive power of the lens assembly will be appropriate, it will be favorable to correct the aberration and improve the image quality of the lens assembly. Preferably, following condition can be satisfied: −0.19<f1/f2<−0.03.

For each of the above infrared projection lens assemblies or the infrared projection modules, wherein the focal length of the first lens is f1, the focal length of the third lens is f3, and following condition is satisfied: 0.34<f1/f3<1.21, so that the distribution of the refractive power of the lens assembly will be appropriate, it will be favorable to correct the aberration and improve the image quality of the lens assembly. Preferably, following condition can be satisfied: 0.52<f1/f3<1.09.

For each of the above infrared projection lens assemblies or the infrared projection modules, wherein the focal length of the infrared projection lens assembly is f, the focal length of the second lens is f2, and following condition is satisfied: −0.22<f/f2<0.40, wherein the ratio f/f2 must not be equal to zero, so that the distribution of the refractive power of the lens assembly will be appropriate, it will be favorable to correct the aberration and improve the projection quality of the lens assembly. Preferably, following condition can be satisfied: −0.15<f/f2<−0.02.

For each of the above infrared projection lens assemblies or the infrared projection modules, wherein a distance from the stop to the image source-side surface of the third lens along the optical axis is SD, the distance from the image-side surface of the first lens to the image plane along the optical axis is TL, and following condition is satisfied: 0.52<SD/TL<0.96, which is favorable to achieve an appropriate balance between miniaturization and the rear focal length. Preferably, following condition can be satisfied: 0.52<SD/TL<0.88 or 0.61<SD/TL<0.96.

For each of the above infrared projection lens assemblies or the infrared projection modules, wherein the radius of curvature of the image source-side surface of the first lens is R2, a radius of curvature of the image source-side surface of the third lens is R6, and following condition is satisfied: 0.06<R2/R6<0.51, which can reduce the spherical aberration and astigmatism of the infrared projection lens assembly effectively. Preferably, following condition can be satisfied: 0.06<R2/R6<0.20 or 0.16<R2/R6<0.51.

For each of the above infrared projection lens assemblies or the infrared projection modules, wherein the central thickness of the third lens along the optical axis is CT3, the radius of curvature of the image-side surface of the third lens is R5, and following condition is satisfied: 0.11<CT3/R5<0.75, which can control the relationship between the surface shape of the image-side surface and the thickness of the third lens, it is favorable to achieve a proper balance between miniaturization and the yield of assembly. Preferably, following condition can be satisfied: 0.30<CT3/R5<0.75 or 0.11<CT3/R5<0.70.

For each of the above infrared projection lens assemblies or the infrared projection modules, wherein the distance from the image-side surface of the first lens to the image source-side surface of the third lens along the optical axis is TD, the distance from the image-side surface of the first lens to the image plane along the optical axis is TL, and following condition is satisfied: 0.48<TD/TL<0.93, which is favorable to the miniaturization of the infrared projection lens assembly and maintain better performance. Preferably, following condition can be satisfied: 0.48<TD/TL<0.85 or 0.59<TD/TL<0.93.

For each of the above infrared projection lens assemblies or the infrared projection modules, wherein the central thickness of the second lens along the optical axis is CT2, the distance from the image-side surface of the first lens to the image plane along the optical axis is TL, and following condition is satisfied: 0.09<CT2/TL<0.23, which is favorable to achieve a proper balance between miniaturization and the lens formability. Preferably, following condition can be satisfied: 0.11<CT2/TL<0.19.

For each of the above infrared projection lens assemblies or the infrared projection modules, wherein a distance from the image source-side surface of the third lenses to the image source plane along the optical axis is BFL, the distance from the image-side surface of the first lens to the image plane along the optical axis is TL, and following condition is satisfied: 0.18<BFL/TL<0.48, which is favorable to achieve an appropriate balance between miniaturization and the rear focal length. Preferably, following condition can be satisfied: 0.23<BFL/TL<0.48 or 0.18<BFL/TL<0.31.

For each of the above infrared projection lens assemblies or the infrared projection modules, wherein the central thickness of the second lens along the optical axis is CT2, the central thickness of the third lens along the optical axis is CT3, and following condition is satisfied: 0.23<CT2/CT3<0.97, so that the thicknesses of the second lens and the third lens can be balanced, which is favorable to achieve a proper balance between miniaturization and the lens formability. Preferably, following condition can be satisfied: 0.42<CT2/CT3<0.74.

The present invention will be presented in further details from the following descriptions with the accompanying drawings, which show, for purpose of illustrations only, the preferred embodiments in accordance with the present invention.

DETAILED DESCRIPTION

Figure 1A:
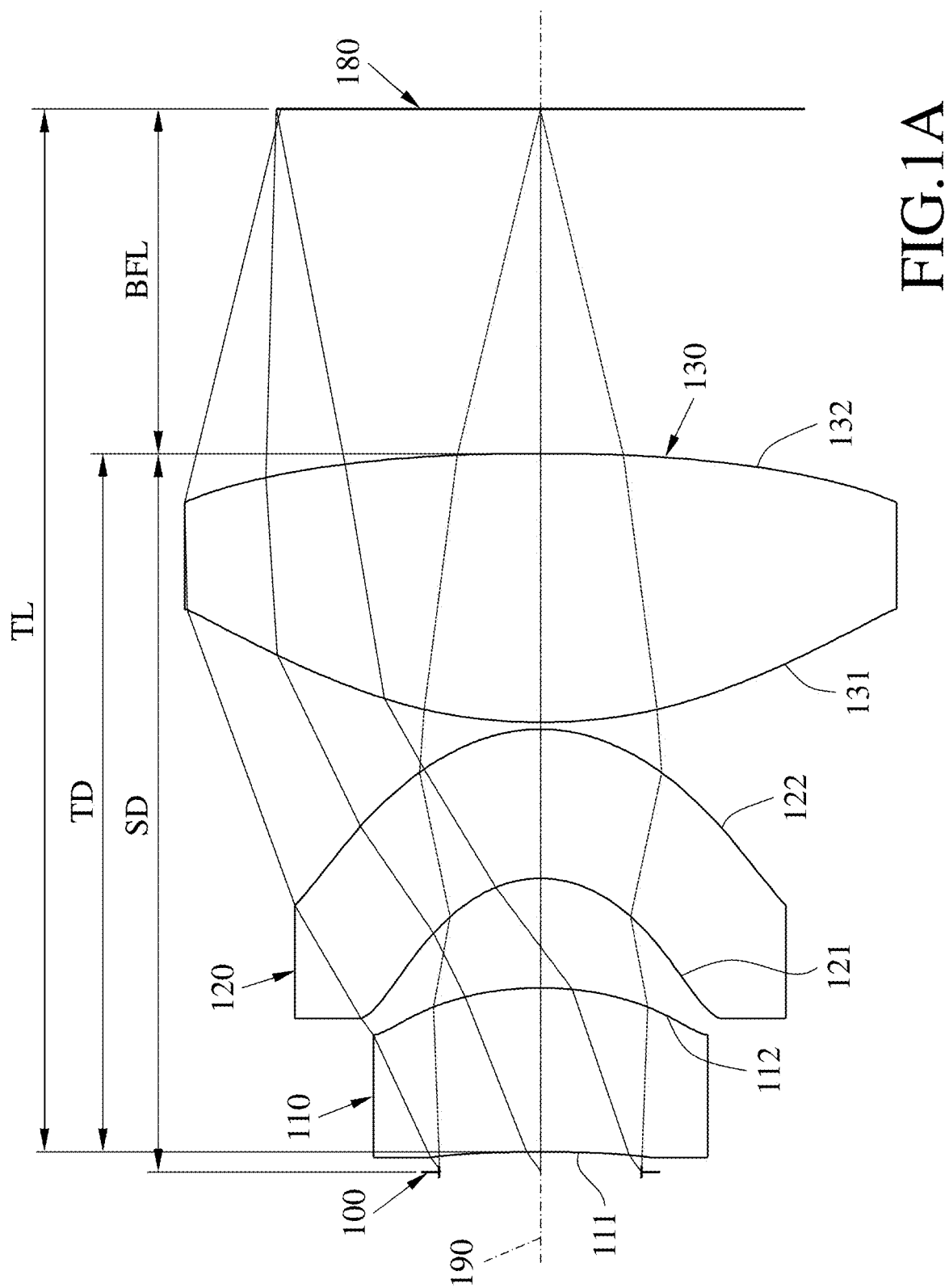
FIG. 1A shows an infrared projection lens assembly in accordance with a first embodiment of the present invention.
Figure 1B:
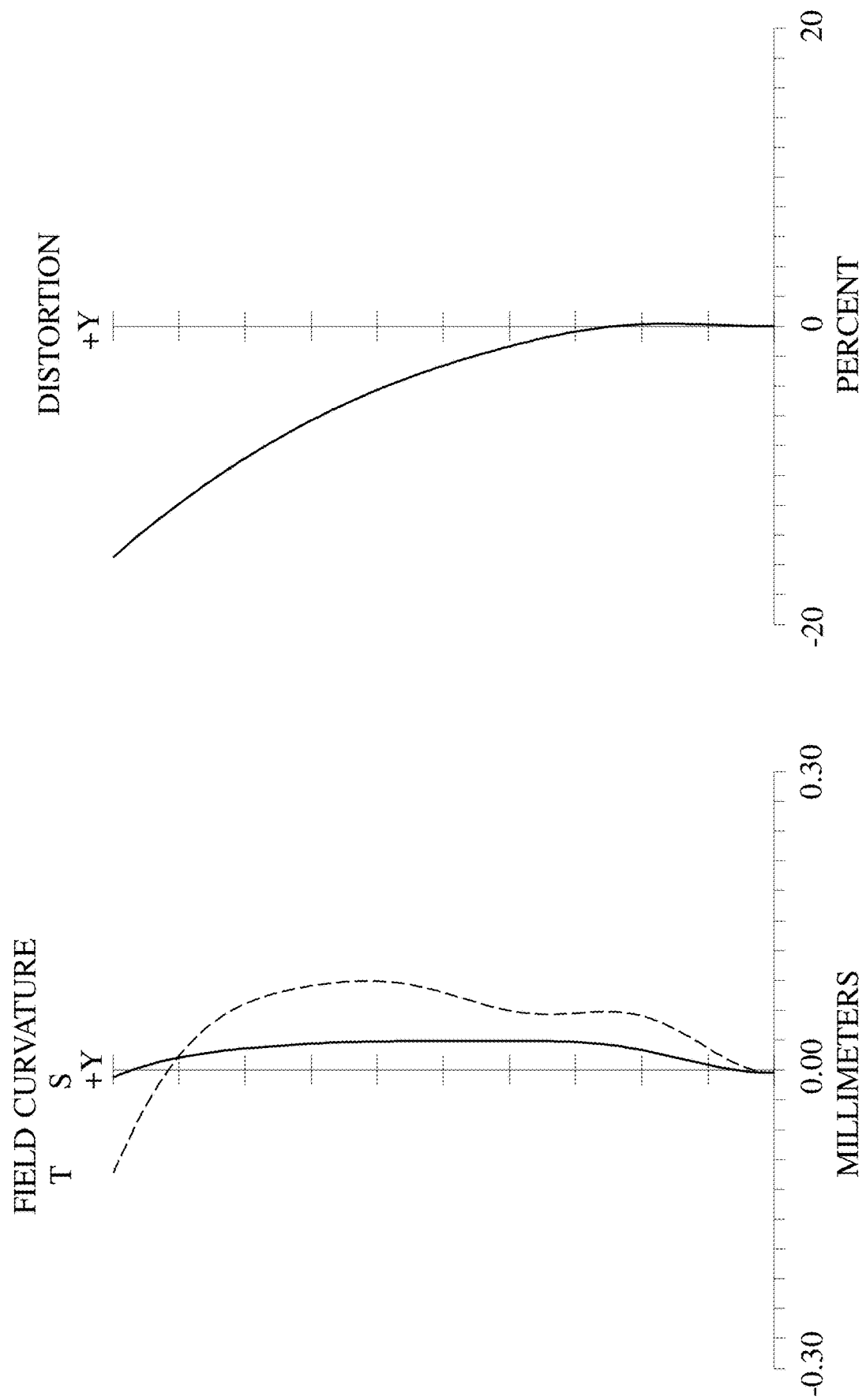
FIG. 1B shows the image plane curve and the distortion curve of the first embodiment of the present invention.

Referring to FIGS. 1A and 1B, FIG. 1A shows an infrared projection lens assembly in accordance with a first embodiment of the present invention, and FIG. 1B shows, in order from left to right, the image plane curve and the distortion curve of the first embodiment of the present invention. An infrared projection lens assembly in accordance with the first embodiment of the present invention comprises, in order from an image side to an image source side: a stop 100, a first lens 110, a second lens 120, a third lens 130, and an image source plane180. Wherein the stop 100 is disposed between an object (not shown) and the first lens 110. The infrared projection lens assembly has a total of three lenses with refractive power.

The first lens 110 with positive refractive power, comprising an image-side surface 111 and an image source-side surface 112, the image-side surface 111 of the first lens 110 being concave near the optical axis 190 and the image source-side surface 112 of the first lens 110 being convex near the optical axis 190, the image-side surface 111 and the image source-side surface 112 of the first lens 110 are aspheric, and the first lens 110 is made of plastic material.

The second lens 120 with negative refractive power, comprising an image-side surface 121 and an image source-side surface 122, the image-side surface 121 of the second lens 120 being concave near the optical axis 190 and the image source-side surface 122 of the second lens 120 being convex near the optical axis 190, the image-side surface 121 and the image source-side surface 122 of the second lens 120 are aspheric, and the second lens 120 is made of plastic material.

The third lens 130 with positive refractive power, comprising an image-side surface 131 and an image source-side surface 132, the image-side surface 131 of the third lens 130 being convex near the optical axis 190 and the image source-side surface 132 of the third lens 130 being convex near the optical axis 190, the image-side surface 131 and the image source-side surface 132 of the third lens 130 are aspheric, and the third lens 130 is made of plastic material.

The equation for the aspheric surface profiles of the respective lenses of the first embodiment is expressed as follows:

$$z(h) = \frac{ch^2}{1 + \left[1 - (k+1)c^2h^2\right]^{0.5}} + \sum (A_i) \cdot (h^i)$$

wherein:

z represents the value of a reference position with respect to a vertex of the surface of a lens and a position with a height h along the optical axis 190;

c represents a paraxial curvature equal to 1/R (R:a paraxial radius of curvature);

h represents a vertical distance from the point on the curve of the aspheric surface to the optical axis 190;

k represents the conic constant;

$A_i$, . . . : represent the i-order aspheric coefficients.

In the first embodiment of the present infrared projection lens assembly, a focal length of the infrared projection lens assembly is f, a f-number of the infrared projection lens assembly is Fno, the infrared projection lens assembly has a maximum view angle FOV, an entrance pupil diameter of the infrared projection lens assembly is EPD, and following conditions are satisfied: f=2.54 mm; Fno=2.08; FOV=73.4 degrees; and EPD=1.23 mm.

In the first embodiment of the present infrared projection lens assembly, a radius of curvature of the image-side surface 111 of the first lens 110 is R1, half of the maximum view angle (field of view) of the infrared projection lens assembly is HFOV, the focal length of the infrared projection lens assembly is f, and following condition is satisfied: R1/(sin(HFOV)*f)=−5.83.

In the first embodiment of the present infrared projection lens assembly, the infrared projection lens assembly has the maximum view angle FOV, the focal length of the infrared projection lens assembly is f, and following condition is satisfied: FOV/f=28.86°/mm.

In the first embodiment of the present infrared projection lens assembly, a radius of curvature of the image source-side surface 112 of the first lens 110 is R2, a radius of curvature of the image-side surface 121 of the second lens 120 is R3, and following condition is satisfied: R2/R3=2.95.

In the first embodiment of the present infrared projection lens assembly, the radius of curvature of the image-side surface 111 of the first lens 110 is R1, a radius of curvature of the image-side surface 131 of the third lens 130 is R5, and following condition is satisfied: R1/R5=−2.57.

In the first embodiment of the present infrared projection lens assembly, the radius of curvature of the image-side surface 111 of the first lens 110 is R1, the entrance pupil diameter of the infrared projection lens assembly is EPD, and following condition is satisfied: R1/EPD=−7.22.

In the first embodiment of the present infrared projection lens assembly, the radius of curvature of the image-side surface 131 of the third lens 130 is R5, the entrance pupil diameter of the infrared projection lens assembly is EPD, and following condition is satisfied: R5/EPD=2.81.

In the first embodiment of the present infrared projection lens assembly, the radius of curvature of the image-side surface 111 of the first lens 110 is R1, a distance from the image-side surface 111 of the first lens 110 to the image plane 180 along the optical axis 190 is TL, the focal length of the infrared projection lens assembly is f, and following condition is satisfied: R1(TL/f)=−21.64 mm.

In the first embodiment of the present infrared projection lens assembly, a focal length of the second lens 120 is f2, a focal length of the third lens 130 is f3, and following condition is satisfied: f2/f3=−16.82.

In the first embodiment of the present infrared projection lens assembly, the focal length of the third lens 130 is f3, the entrance pupil diameter of the infrared projection lens assembly is EPD, and following condition is satisfied: f3/EPD=3.98.

In the first embodiment of the present infrared projection lens assembly, a distance from the image-side surface 111 of the first lens 110 to the image source-side surface 132 of the third lens 130 along the optical axis 190 is TD, the focal length of the infrared projection lens assembly is f, and following condition is satisfied: TD/f=1.64.

In the first embodiment of the present infrared projection lens assembly, the focal length of the second lens 120 is f2, a central thickness of the second lens 120 along the optical axis 190 is CT2, and following condition is satisfied: f2/CT2=−92.36.

In the first embodiment of the present infrared projection lens assembly, a central thickness of the first lens 110 along the optical axis 190 is CT1, the central thickness of the second lens 120 along the optical axis 190 is CT2, and following condition is satisfied: CT1/CT2=1.10.

In the first embodiment of the present infrared projection lens assembly, a central thickness of the third lens 130 along the optical axis 190 is CT3, the central thickness of the second lens 120 along the optical axis 190 is CT2, and following condition is satisfied: CT3/CT2=1.22.

In the first embodiment of the present infrared projection lens assembly, the distance from the image-side surface 111 of the first lens 110 to the image source-side surface 132 of the third lens 130 along the optical axis 190 is TD, a distance from the image source-side surface 122 of the second lens 120 to the image-side surface 131 of the third lens 130 along the optical axis 190 is T23, and following condition is satisfied: TD/T23=98.53.

In the first embodiment of the present infrared projection lens assembly, a focal length of the first lens 110 is f1, the focal length of the second lens 120 is f2, and following condition is satisfied: f1/f2=−0.05.

In the first embodiment of the present infrared projection lens assembly, the focal length of the first lens 110 is f1, the focal length of the third lens 130 is f3, and following condition is satisfied: f1/f3=0.82.

In the first embodiment of the present infrared projection lens assembly, the focal length of the infrared projection lens assembly is f, the focal length of the second lens 120 is f2, and following condition is satisfied: f/f2=−0.03.

In the first embodiment of the present infrared projection lens assembly, a distance from the stop 100 to the image source-side surface 132 of the third lens 130 along the optical axis 190 is SD, the distance from the image-side surface 111 of the first lens 110 to the image plane 180 along the optical axis 190 is TL, and following condition is satisfied: SD/TL=0.69.

In the first embodiment of the present infrared projection lens assembly, the radius of curvature of the image source-side surface 112 of the first lens 110 is R2, a radius of curvature of the image source-side surface 132 of the third lens 130 is R6, and following condition is satisfied: R2/R6=0.10.

In the first embodiment of the present infrared projection lens assembly, the central thickness of the third lens 130 along the optical axis 190 is CT3, the radius of curvature of the image-side surface 131 of the third lens 130 is R5, and following condition is satisfied: CT3/R5=0.47.

In the first embodiment of the present infrared projection lens assembly, the distance from the image-side surface 111 of the first lens 110 to the image source-side surface 132 of the third lens 130 along the optical axis 190 is TD, the distance from the image-side surface 111 of the first lens 110 to the image plane 180 along the optical axis 190 is TL, and following condition is satisfied: TD/TL=0.67.

In the first embodiment of the present infrared projection lens assembly, the central thickness of the second lens 120 along the optical axis 190 is CT2, the distance from the image-side surface 111 of the first lens 110 to the image plane 180 along the optical axis 190 is TL, and following condition is satisfied: CT2/TL=0.14.

In the first embodiment of the present infrared projection lens assembly, a distance from the image source-side surface 132 of the third lenses 130 to the image source plane 180 along the optical axis 190 is BFL, the distance from the image-side surface 111 of the first lens 110 to the image plane 180 along the optical axis 190 is TL, and following condition is satisfied: BFL/TL=0.33.

In the first embodiment of the present infrared projection lens assembly, the central thickness of the second lens 120 along the optical axis 190 is CT2, the central thickness of the third lens 130 along the optical axis 190 is CT3, and following condition is satisfied: CT2/CT3=0.55.

The detailed optical data of the first embodiment is shown in table 1, and the aspheric surface data is shown in table 2.

TABLE 1

Embodiment 1
f(focal length) = 2.54 mm, Fno = 2.08, FOV = 73.4 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | stop | infinity | | 0.120 | | | | |
| 2 | Lens 1 | −8.849 | (ASP) | 0.978 | plastic | 1.643 | 22.5 | 3.99 |
| 3 | | −2.012 | (ASP) | 0.653 | | | | |
| 4 | Lens 2 | −0.682 | (ASP) | 0.888 | plastic | 1.643 | 22.5 | −81.98 |
| 5 | | −1.035 | (ASP) | 0.042 | | | | |
| 6 | Lens 3 | 3.439 | (ASP) | 1.602 | plastic | 1.643 | 22.5 | 4.87 |
| 7 | | −20.159 | (ASP) | 2.054 | | | | |
| 8 | Image source plane | infinity | | — | | | | |

Note:
reference wavelength is 940 nm

TABLE 2

Aspheric Coefficients

| | surface | | | | | |
|---|---|---|---|---|---|---|
| | 2 | 3 | 4 | 5 | 6 | 7 |
| K: | −2.5000E+02 | 1.7266E+00 | −8.0731E−01 | −1.0586E+00 | −6.6014E+00 | 2.9578E+01 |
| A2: | 0.0000E+00 | 0.0000E+00 | 0.0000E+00 | 0.0000E+00 | 0.0000E+00 | 0.0000E+00 |
| A4: | 5.9422E−02 | 1.2908E−02 | −3.6435E−02 | 1.1904E−02 | 3.9863E−02 | −3.9290E−02 |
| A6: | −1.6749E+00 | −1.7616E−01 | −1.6382E−01 | −7.0862E−02 | −1.3235E−02 | 3.5114E−02 |
| A8: | 1.0662E+01 | 4.3190E+01 | 8.3822E−01 | 1.1196E−01 | 4.6853E−04 | −1.7851E−02 |
| A10: | −3.6201E+01 | −4.8091E−01 | −1.5848E+00 | −9.9690E−02 | 8.0739E−04 | 4.8945E−03 |
| A12: | 6.2483E+01 | 2.3516E−01 | 1.4484E+00 | 4.2519E−02 | −1.8755E−04 | −6.8720E−04 |
| A14: | −4.2883E+01 | 1.2135E−02 | −4.4527E−01 | −6.5074E−03 | 1.2425E−05 | 3.8428E−05 |
| A16: | 0.0000E+00 | 0.0000E+00 | 0.0000E+00 | 0.0000E+00 | 0.0000E+00 | 0.0000E+00 |

The units of the radius of curvature, the thickness and the focal length in table 1 are expressed in mm, the surface numbers 0-8 represent the surfaces sequentially arranged from the image side to the image source side, wherein the value of the overlapped field between the horizontal direction of the surface 0 field and the vertical direction of the thickness/gap field is a gap between the object and the stop 100 along the optical axis 190, the value of the overlapped field between the horizontal direction of the surface 1 field and the vertical direction of the thickness/gap field is a gap between the stop 100 and the image-side surface 111 of the first lens 110 along the optical axis 190, the values of the overlapped field between the horizontal direction of the surfaces 2, 4, 6 fields and the vertical direction of the thickness/gap field are thicknesses of the first lens 110, the second lens 120, and the third lens130 along the optical axis 190, respectively, the value of the overlapped field between the horizontal direction of the surface 3 field and the vertical direction of the thickness/gap field is a gap between the first lens 110 and the second lens 120 along the optical axis 190, the value of the overlapped field between the horizontal direction of the surface 5 field and the vertical direction of the thickness/gap field is a gap between the second lens 120 and the third lens 130 along the optical axis 190, the value of the overlapped field between the horizontal direction of the surface 7 field and the vertical direction of the thickness/gap field is a gap between the third lens 130 and the image source plane180 along the optical axis 190.

In table 2, k represents the conic coefficient of the equation of the aspheric surface profiles, and A2, A4, A6, A8, A10, A12, A14, A16: represent the high-order aspheric coefficients. The values of each of columns numbered as 2, 3, 4, 5, 6, or 7 are the values of k, A2, A4, A6, A8, A10, A12, A14, or A16 on the surface of the second, third, fourth, fifth, sixth, or seventh, respectively. The tables presented below for each embodiment are the corresponding schematic parameter and image plane curves, and the definitions of the tables are the same as Table 1 and Table 2 of the first embodiment. Therefore, an explanation in this regard will not be provided again.

Figure 2A:
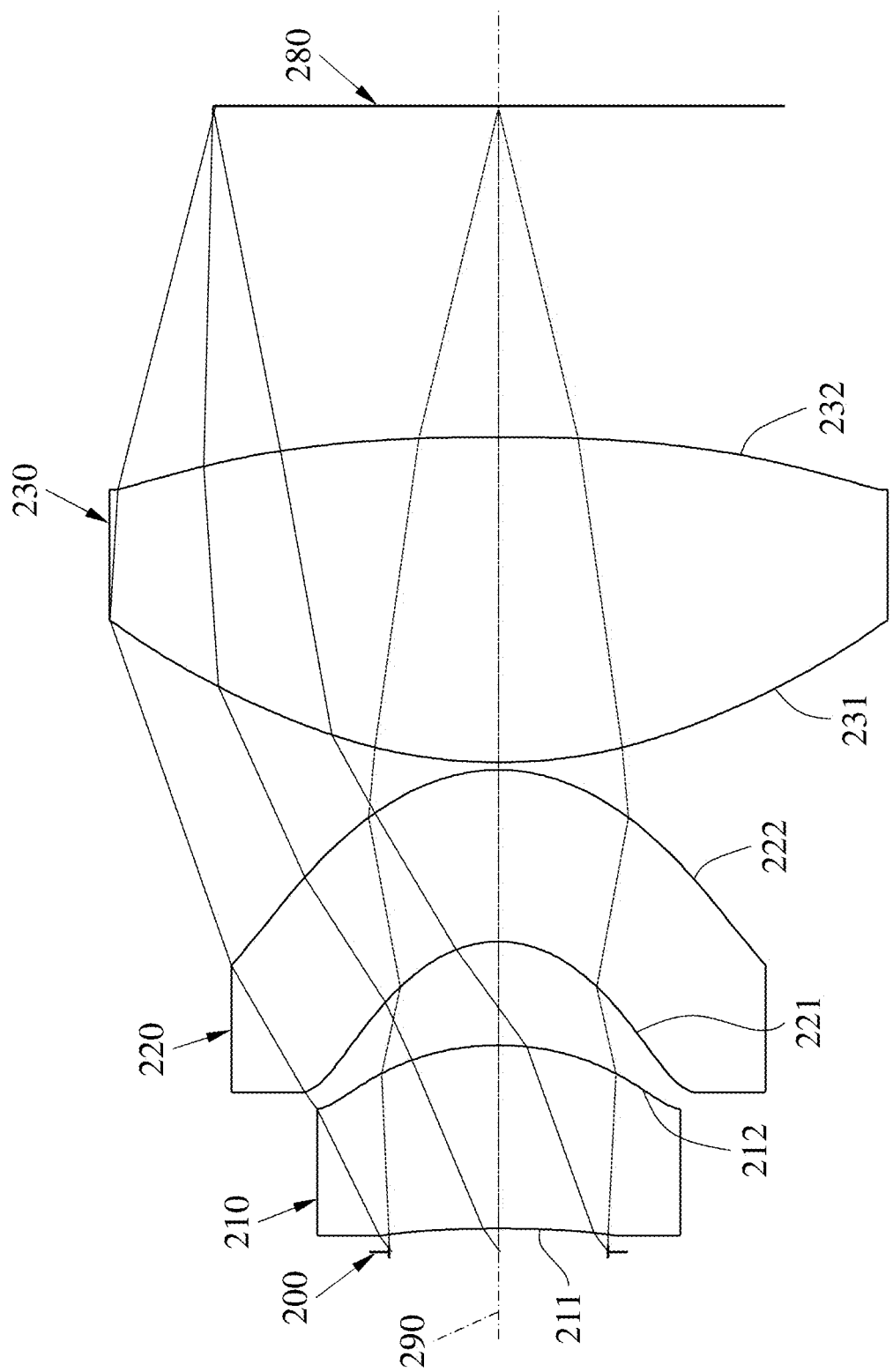
FIG. 2A shows an infrared projection lens assembly in accordance with a second embodiment of the present invention.
Figure 2B:
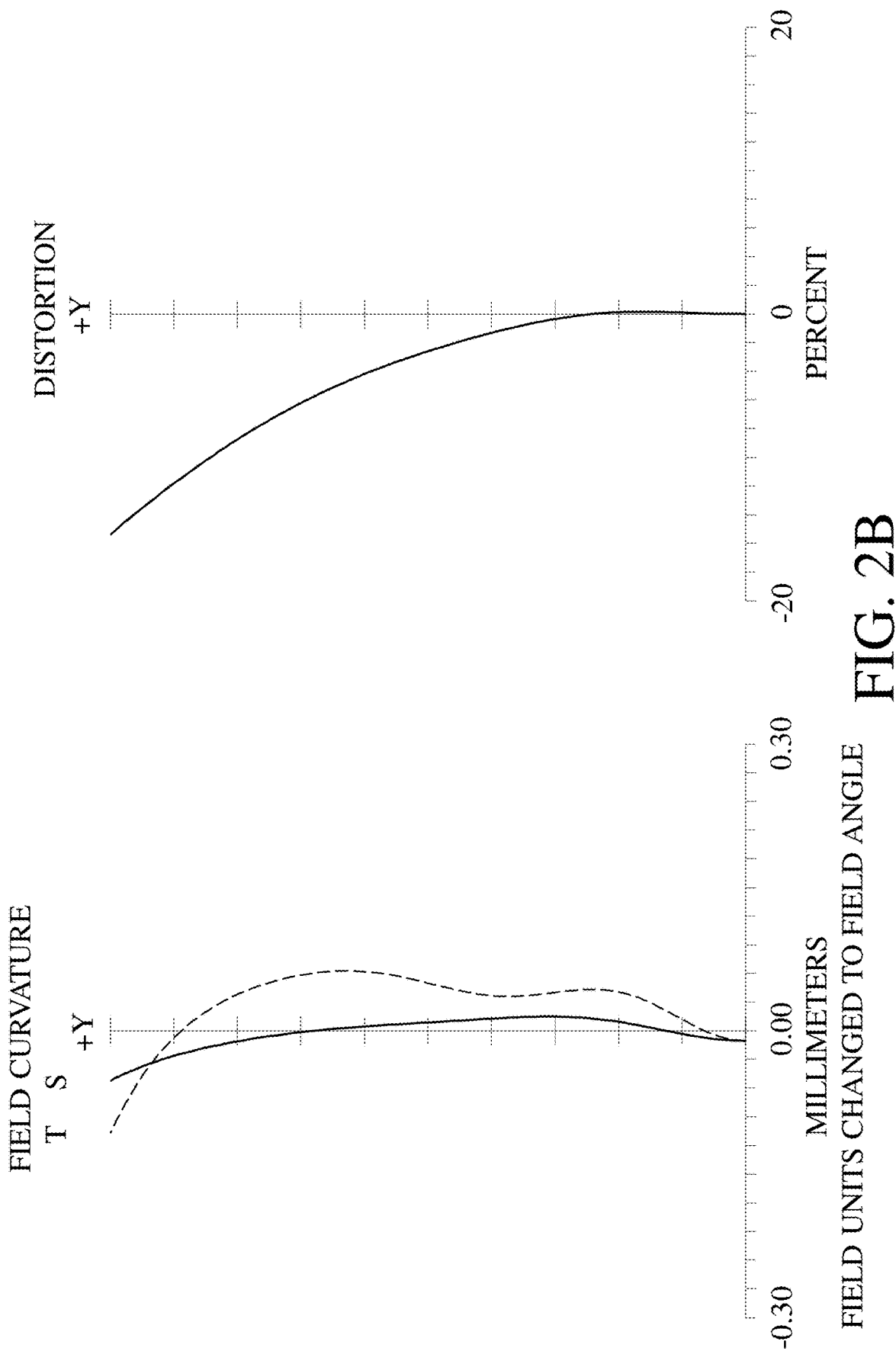
FIG. 2B shows the image plane curve and the distortion curve of the second embodiment of the present invention.

Referring to FIGS. 2A and 2B, FIG. 2A shows an infrared projection lens assembly in accordance with a second embodiment of the present invention, and FIG. 2B shows, in order from left to right, the image plane curve and the distortion curve of the second embodiment of the present invention. An infrared projection lens assembly in accordance with the second embodiment of the present invention comprises, in order from an image side to an image source side: a stop 200, a first lens 210, a second lens 220, a third lens 230, and an image source plane 280. Wherein the stop 200 is disposed between an object (not shown) and the first lens 210. The infrared projection lens assembly has a total of three lenses with refractive power.

The first lens 210 with positive refractive power, comprising an image-side surface 211 and an image source-side surface 212, the image-side surface 211 of the first lens 210 being concave near the optical axis 290 and the image source-side surface 212 of the first lens 210 being convex near the optical axis 290, the image-side surface 211 and the image source-side surface 212 of the first lens 210 are aspheric, and the first lens 210 is made of plastic material.

The second lens 220 with negative refractive power, comprising an image-side surface 221 and an image source-side surface 222, the image-side surface 221 of the second lens 220 being concave near the optical axis 290 and the image source-side surface 222 of the second lens 220 being convex near the optical axis 290, the image-side surface 221 and the image source-side surface 222 of the second lens 220 are aspheric, and the second lens 220 is made of plastic material.

The third lens 230 with positive refractive power, comprising an image-side surface 231 and an image source-side surface 232, the image-side surface 231 of the third lens 230 being convex near the optical axis 290 and the image source-side surface 232 of the third lens 230 being convex near the optical axis 290, the image-side surface 231 and the image source-side surface 232 of the third lens 230 are aspheric, and the third lens 230 is made of plastic material.

The detailed optical data of the second embodiment is shown in table 3, and the aspheric surface data is shown in table 4.

TABLE 3

Embodiment 2
f(focal length) = 2.55 mm, Fno = 2.08, FOV = 73.1 deg.

| surface | | Curvature Radius | | Thickness/gap | Material | Index (nd) | Abbe # (vd) | Focal length |
|---|---|---|---|---|---|---|---|---|
| 0 | object | infinity | | infinity | | | | |
| 1 | stop | infinity | | 0.129 | | | | |
| 2 | Lens 1 | −7.232 | (ASP) | 1.012 | plastic | 1.544 | 56 | 3.31 |
| 3 | | −1.491 | (ASP) | 0.572 | | | | |
| 4 | Lens 2 | −0.621 | (ASP) | 0.949 | plastic | 1.544 | 56 | −25.01 |
| 5 | | −0.998 | (ASP) | 0.041 | | | | |
| 6 | Lens 3 | 2.999 | (ASP) | 1.797 | plastic | 1.544 | 56 | 4.98 |
| 7 | | −18.676 | (ASP) | 1.829 | | | | |
| 8 | Image source plane | infinity | | — | | | | |

Note:
reference wavelength is 940 nm

TABLE 4

Aspheric Coefficients

| surface | 2 | 3 | 4 | 5 | 6 | 7 |
|---|---|---|---|---|---|---|
| K:  | −3.6754E+01 | 9.0959E−01 | −8.5075E−01 | −1.0284E+00 | −6.3168E+00 | 5.5820E+01 |
| A2: | 0.0000E+00 | 0.0000E+00 | 0.0000E+00 | 0.0000E+00 | 0.0000E+00 | 0.0000E+00 |
| A4: | 4.2437E−02 | 3.0633E−02 | −9.4484E−03 | 1.2979E−02 | 3.9146E−02 | −4.1378E−02 |
| A6: | −1.5496E+00 | −1.4920E−01 | −1.5550E−01 | −7.0157E−02 | −1.3213E−02 | 3.5030E−02 |
| A8: | 1.0377E+01 | 4.4256E−01 | 8.5300E−01 | 1.1374E−01 | 5.9197E−04 | −1.7805E−02 |
| A10: | −3.6217E+01 | −4.7628E−01 | −1.5511E+00 | −9.9187E−02 | 8.2005E−04 | 4.9129E−03 |
| A12: | 6.2830E+01 | 2.4742E−01 | 1.4631E+00 | 4.2397E−02 | −1.9361E−04 | −6.8020E−04 |
| A14: | −4.2699E+01 | 4.0845E−02 | −4.7883E−01 | −6.6439E−03 | 1.3332E−05 | 3.7468E−05 |
| A16: | 0.0000E+00 | 0.0000E+00 | 0.0000E+00 | 0.0000E+00 | 0.0000E+00 | 0.0000E+00 |

In the second embodiment, the equation of the aspheric surface profiles of the aforementioned lenses is the same as the equation of the first embodiment. Also, the definitions of these parameters shown in the following table are the same as those stated in the first embodiment with corresponding values for the second embodiment, so an explanation in this regard will not be provided again. Moreover, these parameters can be calculated from Table 3 and Table 4 as the following values and satisfy the following conditions:

| Embodiment 2 | | | |
|---|---|---|---|
| f[mm] | 2.55 | f2/CT2 | −26.37 |
| Fno | 2.08 | CT1/CT2 | 1.07 |
| FOV[deg.] | 73.1 | CT3/CT2 | 1.50 |
| EPD[mm] | 1.23 | TD/T23 | 107.54 |
| R1/(sin(HFOV)*f) | −4.76 | f1/f2 | −0.13 |
| FOV/f [*/mm] | 28.66 | f1/f3 | 0.66 |
| R2/R3 | 2.40 | f/f2 | −0.10 |
| R1/R5 | −2.41 | SD/TL | 0.73 |
| R1/EPD | −5.90 | R2/R6 | 0.08 |
| R5/EPD | 2.45 | CT3/R5 | 0.60 |
| R1*(TL/f) [mm] | −17.58 | TD/TL | 0.70 |
| f2/f3 | −5.02 | CT2/TL | 0.15 |
| f3/EPD | 4.06 | BFL/TL | 0.30 |
| TD/f | 1.71 | CT2/CT3 | 0.53 |

Figure 3A:
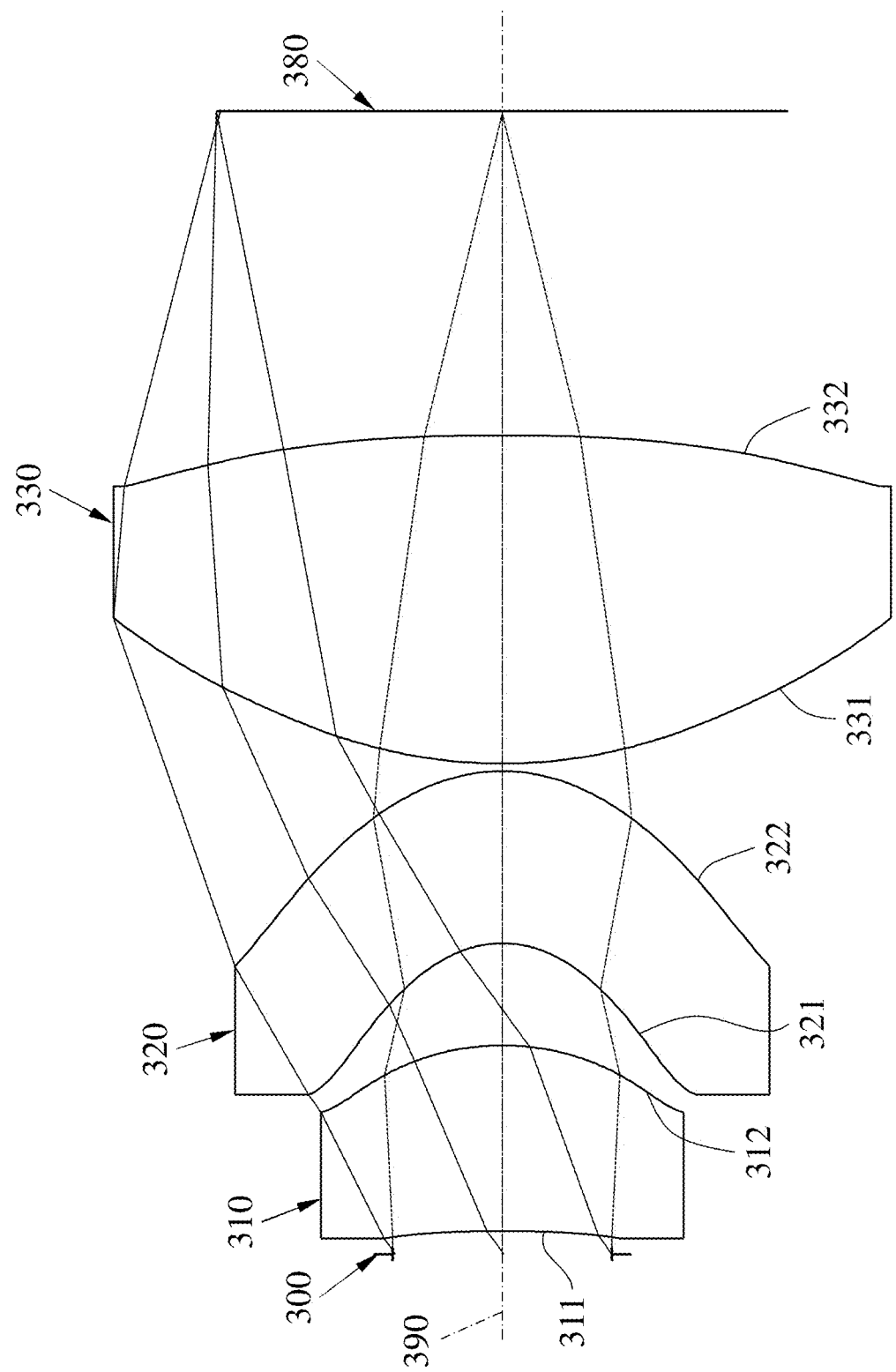
FIG. 3A shows an infrared projection lens assembly in accordance with a third embodiment of the present invention.
Figure 3B:
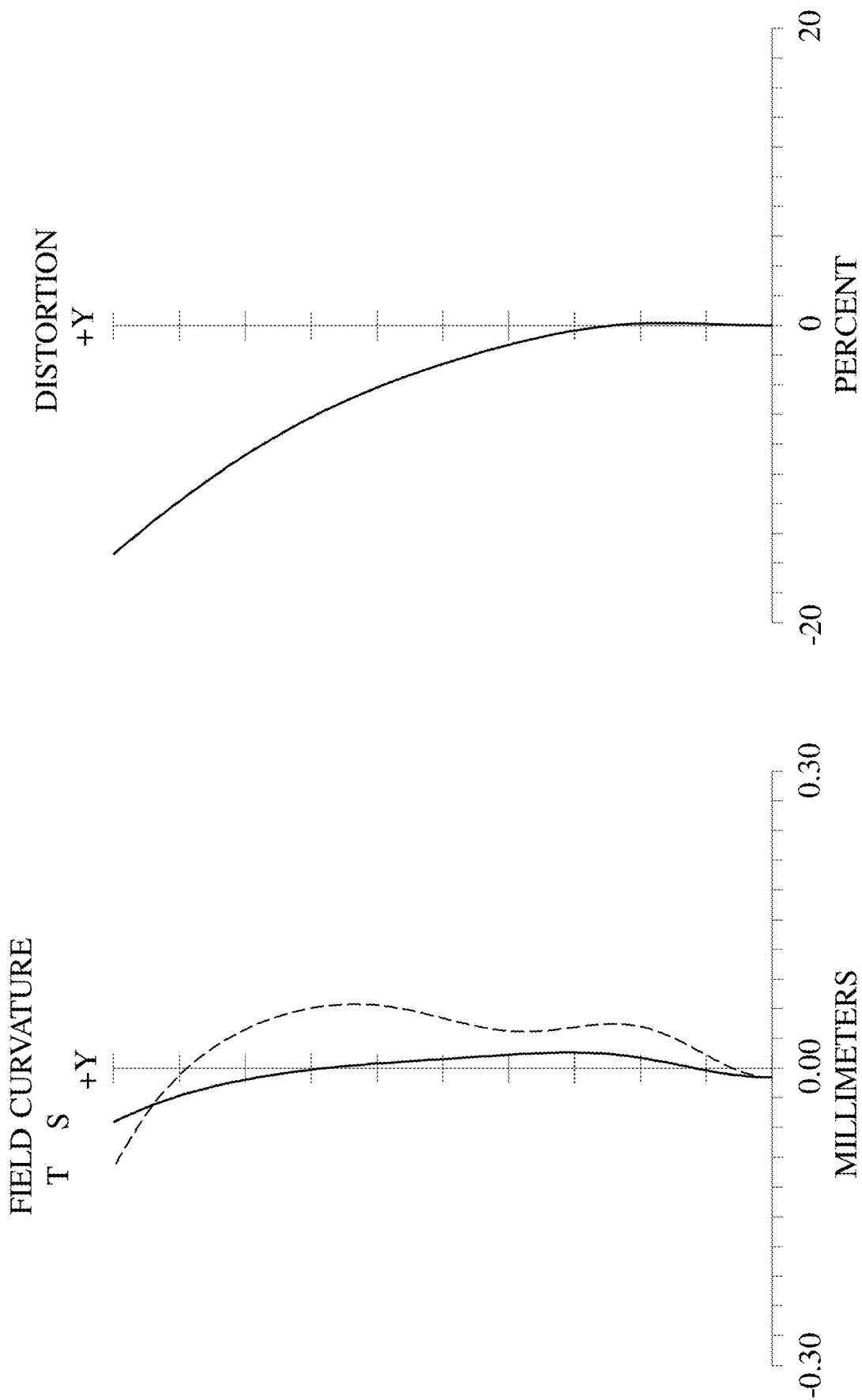
FIG. 3B shows the image plane curve and the distortion curve of the third embodiment of the present invention.

Referring to FIGS. 3A and 3B, FIG. 3A shows an infrared projection lens assembly in accordance with a third embodiment of the present invention, and FIG. 3B shows, in order from left to right, the image plane curve and the distortion curve of the third embodiment of the present invention. An infrared projection lens assembly in accordance with the third embodiment of the present invention comprises, in order from an image side to an image source side: a stop 300, a first lens 310, a second lens 320, a third lens 330, and an image source plane 380. Wherein the stop 300 is disposed between an object (not shown) and the first lens 310. The infrared projection lens assembly has a total of three lenses with refractive power.

The first lens 310 with positive refractive power, comprising an image-side surface 311 and an image source-side surface 312, the image-side surface 311 of the first lens 310 being concave near the optical axis 390 and the image source-side surface 312 of the first lens 310 being convex near the optical axis 390, the image-side surface 311 and the image source-side surface 312 of the first lens 310 are aspheric, and the first lens 310 is made of plastic material.

The second lens 320 with negative refractive power, comprising an image-side surface 321 and an image source-side surface 322, the image-side surface 321 of the second lens 320 being concave near the optical axis 390 and the image source-side surface 322 of the second lens 320 being convex near the optical axis 390, the image-side surface 321 and the image source-side surface 322 of the second lens 320 are aspheric, and the second lens 320 is made of plastic material.

The third lens 330 with positive refractive power, comprising an image-side surface 331 and an image source-side surface 332, the image-side surface 331 of the third lens 330 being convex near the optical axis 390 and the image source-side surface 332 of the third lens 330 being convex near the optical axis 390, the image-side surface 331 and the image source-side surface 332 of the third lens 330 are aspheric, and the third lens 330 is made of plastic material.

The detailed optical data of the third embodiment is shown in table 5, and the aspheric surface data is shown in table 6.

TABLE 5

Embodiment 3
f(focal length) = 2.55 mm, Fno = 2.08, FOV = 73.1 deg.

| surface | | Curvature Radius | Thickness/gap | Material | Index (nd) | Abbe # (vd) | Focal length |
|---|---|---|---|---|---|---|---|
| 0 | object | infinity | infinity | | | | |
| 1 | stop | infinity | 0.129 | | | | |
| 2 | Lens 1 | −7.033 (ASP) | 1.025 | plastic | 1.535 | 56 | 3.21 |
| 3 | | −1.429 (ASP) | 0.564 | | | | |
| 4 | Lens 2 | −0.611 (ASP) | 0.954 | plastic | 1.535 | 56 | −20.57 |
| 5 | | −0.996 (ASP) | 0.041 | | | | |
| 6 | Lens 3 | 2.913 (ASP) | 1.815 | plastic | 1.535 | 56 | 4.94 |
| 7 | | −18.867 (ASP) | 1.793 | | | | |
| 8 | Image source plane | infinity | — | | | | |

Note:
reference wavelength is 940 nm

TABLE 6

Aspheric Coefficients

| surface | 2 | 3 | 4 | 5 | 6 | 7 |
|---|---|---|---|---|---|---|
| K: | −1.6858E+01 | 7.5350E−01 | −8.5909E−01 | −1.0270E+00 | −6.5932E+00 | 5.4783E+01 |
| A2: | 0.0000E+00 | 0.0000E+00 | 0.0000E+00 | 0.0000E+00 | 0.0000E+00 | 0.0000E+00 |
| A4: | 4.3414E−02 | 3.4694E−02 | 4.2785E−03 | 1.2799E−02 | 3.9003E−02 | −4.2086E−02 |
| A6: | −1.5241E+00 | −1.4720E−01 | −1.6306E−01 | −6.9857E−02 | −1.3108E−02 | 3.5109E−02 |
| A8: | 1.0316E+01 | 4.4315E−01 | 8.4942E−01 | 1.1359E−01 | 6.2268E−04 | −1.7791E−02 |
| A10: | −3.6201E+01 | −4.8058E−01 | −1.5491E+00 | −9.9126E−02 | 8.1689E−04 | 4.9103E−03 |
| A12: | 6.2641E+01 | 2.4363E−01 | 1.4671E+00 | 4.2370E−02 | −1.9579E−04 | −6.8077E−04 |
| A14: | −4.2202E+01 | 4.9871E−02 | −4.8101E−01 | −6.6362E−03 | 1.3778E−05 | 3.7752E−05 |
| A16: | 0.0000E+00 | 0.0000E+00 | 0.0000E+00 | 0.0000E+00 | 0.0000E+00 | 0.0000E+00 |

In the third embodiment, the equation of the aspheric surface profiles of the aforementioned lenses is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | | | |
|---|---|---|---|
| f[mm] | 2.55 | f2/CT2 | −21.57 |
| Fno | 2.08 | CT1/CT2 | 1.07 |
| FOV[deg.] | 73.1 | CT3/CT2 | 1.54 |
| EPD[mm] | 1.23 | TD/T23 | 108.41 |
| R1/(sin(HFOV)*f) | −4.63 | f1/f2 | −0.16 |
| FOV/f [*/mm] | 28.67 | f1/f3 | 0.65 |
| R2/R3 | 2.34 | f/f2 | −0.12 |
| R1/R5 | −2.41 | SD/TL | 0.73 |
| R1/EPD | −5.74 | R2/R6 | 0.08 |
| R5/EPD | 2.38 | CT3/R5 | 0.62 |
| R1*(TL/f) [mm] | −17.07 | TD/TL | 0.71 |
| f2/f3 | −4.16 | CT2/TL | 0.15 |
| f3/EPD | 4.03 | BFL/TL | 0.29 |
| TD/f | 1.72 | CT2/CT3 | 0.53 |

Figure 4A:
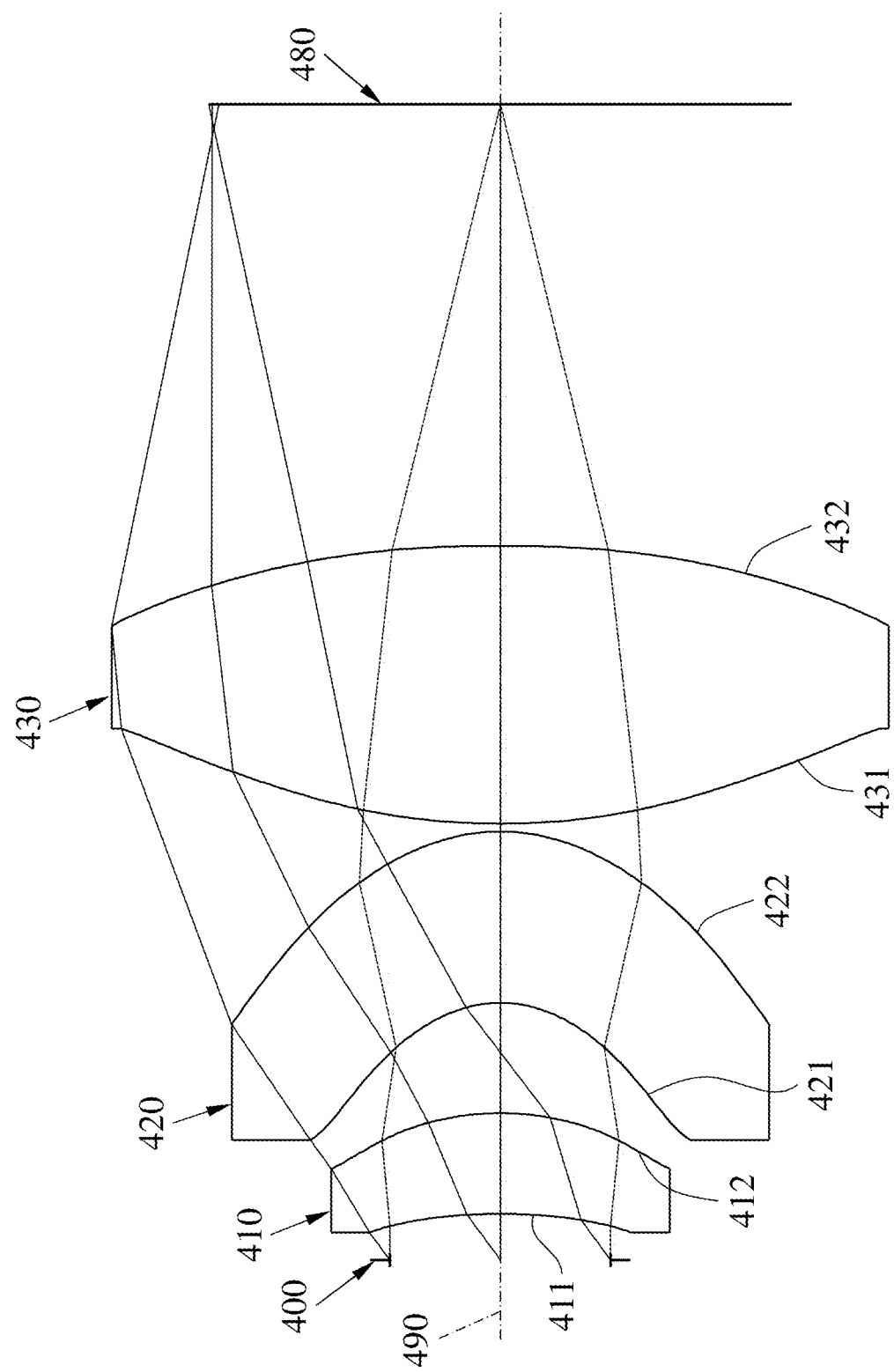
FIG. 4A shows an infrared projection lens assembly in accordance with a fourth embodiment of the present invention.
Figure 4B:
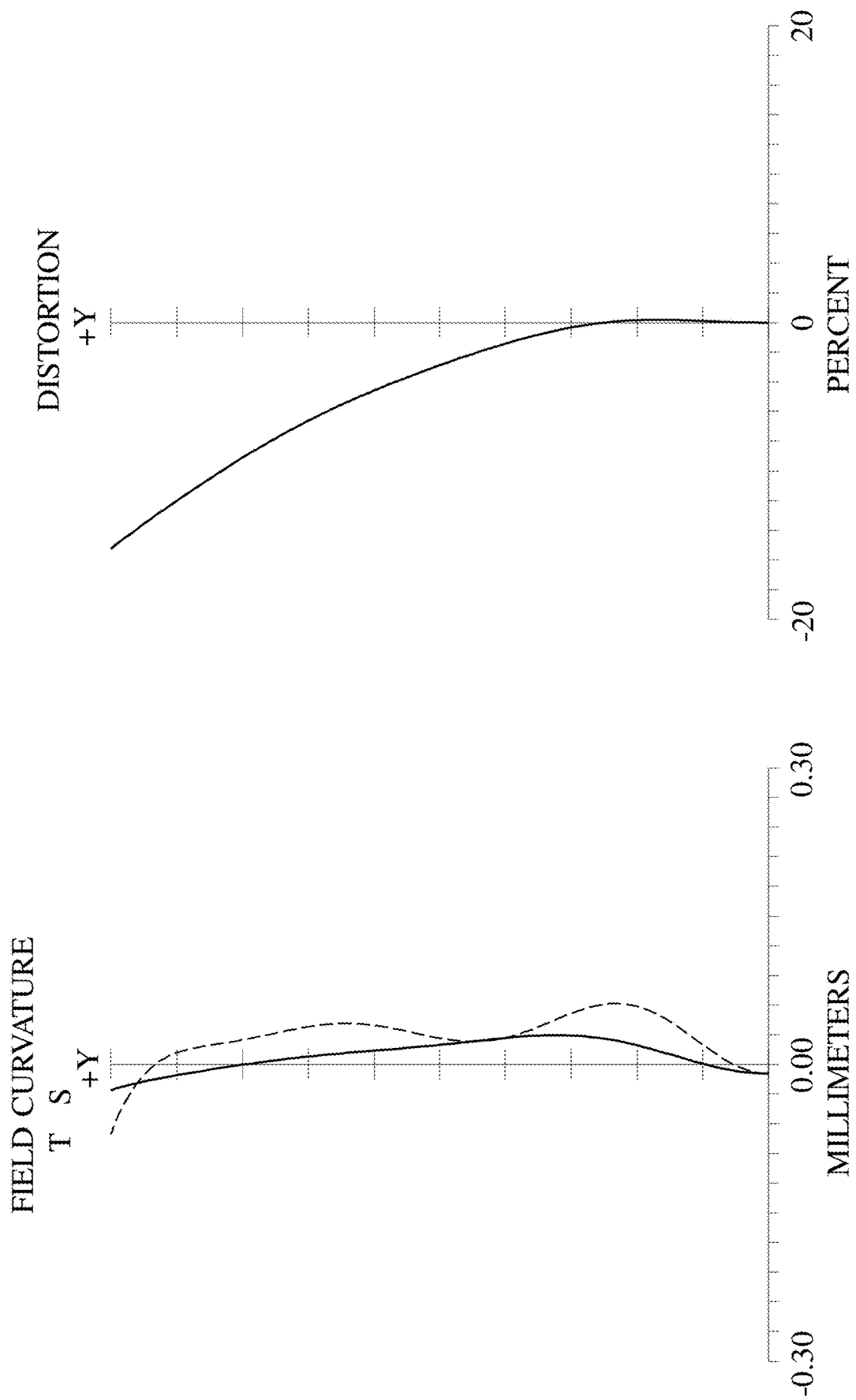
FIG. 4B shows the image plane curve and the distortion curve of the fourth embodiment of the present invention.

Referring to FIGS. 4A and 4B, FIG. 4A shows an infrared projection lens assembly in accordance with a fourth embodiment of the present invention, and FIG. 4B shows, in order from left to right, the image plane curve and the distortion curve of the fourth embodiment of the present invention. An infrared projection lens assembly in accordance with the fourth embodiment of the present invention comprises, in order from an image side to an image source side: a stop 400, a first lens 410, a second lens 420, a third lens 430, and an image source plane 480. Wherein the stop 400 is disposed between an object (not shown) and the first lens 410. The infrared projection lens assembly has a total of three lenses with refractive power.

The first lens 410 with positive refractive power, comprising an image-side surface 411 and an image source-side surface 412, the image-side surface 411 of the first lens 410 being concave near the optical axis 490 and the image source-side surface 412 of the first lens 410 being convex near the optical axis 490, the image-side surface 411 and the image source-side surface 412 of the first lens 410 are aspheric, and the first lens 410 is made of plastic material.

The second lens 420 with negative refractive power, comprising an image-side surface 421 and an image source-side surface 422, the image-side surface 421 of the second lens 420 being concave near the optical axis 490 and the image source-side surface 422 of the second lens 420 being convex near the optical axis 490, the image-side surface 421 and the image source-side surface 422 of the second lens 420 are aspheric, and the second lens 420 is made of plastic material.

The third lens 430 with positive refractive power, comprising an image-side surface 431 and an image source-side surface 432, the image-side surface 431 of the third lens 430 being convex near the optical axis 490 and the image source-side surface 432 of the third lens 430 being convex near the optical axis 490, the image-side surface 431 and the image source-side surface 432 of the third lens 430 are aspheric, and the third lens 430 is made of plastic material.

The detailed optical data of the fourth embodiment is shown in table 7, and the aspheric surface data is shown in table 8.

TABLE 7

Embodiment 4
f(focal length) = 2.53 mm, Fno = 2.07, FOV = 73.4 deg.

| surface | | Curvature Radius | Thickness/gap | Material | Index (nd) | Abbe # (vd) | Focal length |
|---|---|---|---|---|---|---|---|
| 0 | object | infinity | infinity | | | | |
| 1 | stop | infinity | 0.252 | | | | |
| 2 | Lens 1 | −3.220 (ASP) | 0.553 | plastic | 1.643 | 22.5 | 4.37 |
| 3 | | −1.567 (ASP) | 0.604 | | | | |
| 4 | Lens 2 | −0.700 (ASP) | 0.941 | plastic | 1.643 | 22.5 | −79.07 |
| 5 | | −1.075 (ASP) | 0.043 | | | | |
| 6 | Lens 3 | 4.083 (ASP) | 1.525 | plastic | 1.643 | 22.5 | 4.81 |
| 7 | | −9.406 (ASP) | 2.420 | | | | |
| 8 | Image source plane | infinity | — | | | | |

Note:
reference wavelength is 940 nm

TABLE 8

Aspheric Coefficients

| surface | 2 | 3 | 4 | 5 | 6 | 7 |
|---|---|---|---|---|---|---|
| K: | −5.1445E+01 | 1.3587E+00 | −8.7136E−01 | −1.2023E+00 | −1.2503E+01 | 1.4670E+01 |
| A2: | 0.0000E+00 | 0.0000E+00 | 0.0000E+00 | 0.0000E+00 | 0.0000E+00 | 0.0000E+00 |
| A4: | −5.5663E−02 | 5.4374E−02 | 2.2623E−02 | 1.6711E−02 | 3.7027E−02 | −4.2335E−02 |
| A6: | −1.8410E+00 | −1.8885E−01 | −2.2477E−01 | −8.0653E−02 | −1.3230E−02 | 3.5871E−02 |
| A8: | 1.1465E+01 | 4.1856E−01 | 7.6076E−01 | 1.1370E−01 | 5.5997E−04 | −1.7626E−02 |
| A10: | −3.6060E+01 | −3.7825E−01 | −1.5153E+00 | −9.9076E−02 | 8.2735E−04 | 4.8989E−03 |
| A12: | 5.7461E+01 | 3.1367E−01 | 1.5430E+00 | 4.1390E−02 | −1.8717E−04 | −6.9824E−04 |
| A14: | −3.6331E+01 | −2.8695E−02 | −5.2939E−01 | −6.3165E−03 | 1.1111E−05 | 3.9674E−05 |
| A16: | 0.0000E+00 | 0.0000E+00 | 0.0000E+00 | 0.0000E+00 | 0.0000E+00 | 0.0000E+00 |

In the fourth embodiment, the equation of the aspheric surface profiles of the aforementioned lenses is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | | | |
|---|---|---|---|
| f[mm] | 2.53 | f2/CT2 | −84.07 |
| Fno | 2.07 | CT1/CT2 | 0.59 |
| FOV[deg.] | 73.4 | CT3/CT2 | 1.10 |
| EPD[mm] | 1.23 | TD/T23 | 84.39 |
| R1/(sin(HFOV)*f) | −2.13 | f1/f2 | −0.06 |
| FOV/f [*/mm] | 28.99 | f1/f3 | 0.91 |
| R2/R3 | 2.24 | f/f2 | −0.03 |
| R1/R5 | −0.79 | SD/TL | 0.64 |
| R1/EPD | −2.63 | R2/R6 | 0.17 |
| R5/EPD | 3.33 | CT3/R5 | 0.37 |
| R1*(TL/f) [mm] | −7.74 | TD/TL | 0.60 |
| f2/f3 | −16.45 | CT2/TL | 0.15 |
| f3/EPD | 3.92 | BFL/TL | 0.40 |
| TD/f | 1.45 | CT2/CT3 | 0.62 |

Figure 5A:
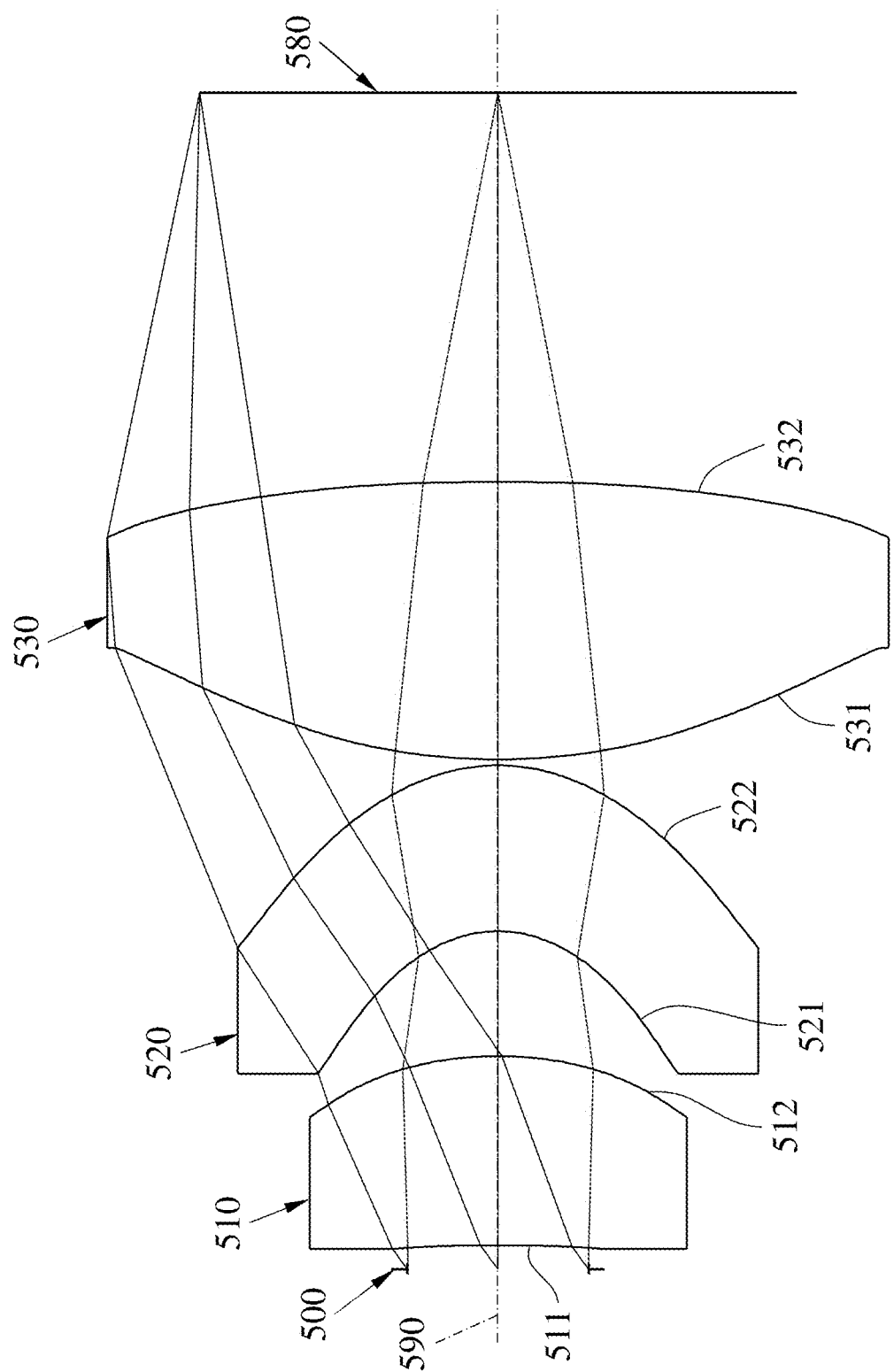
FIG. 5A shows an infrared projection lens assembly in accordance with a fifth embodiment of the present invention.
Figure 5B:
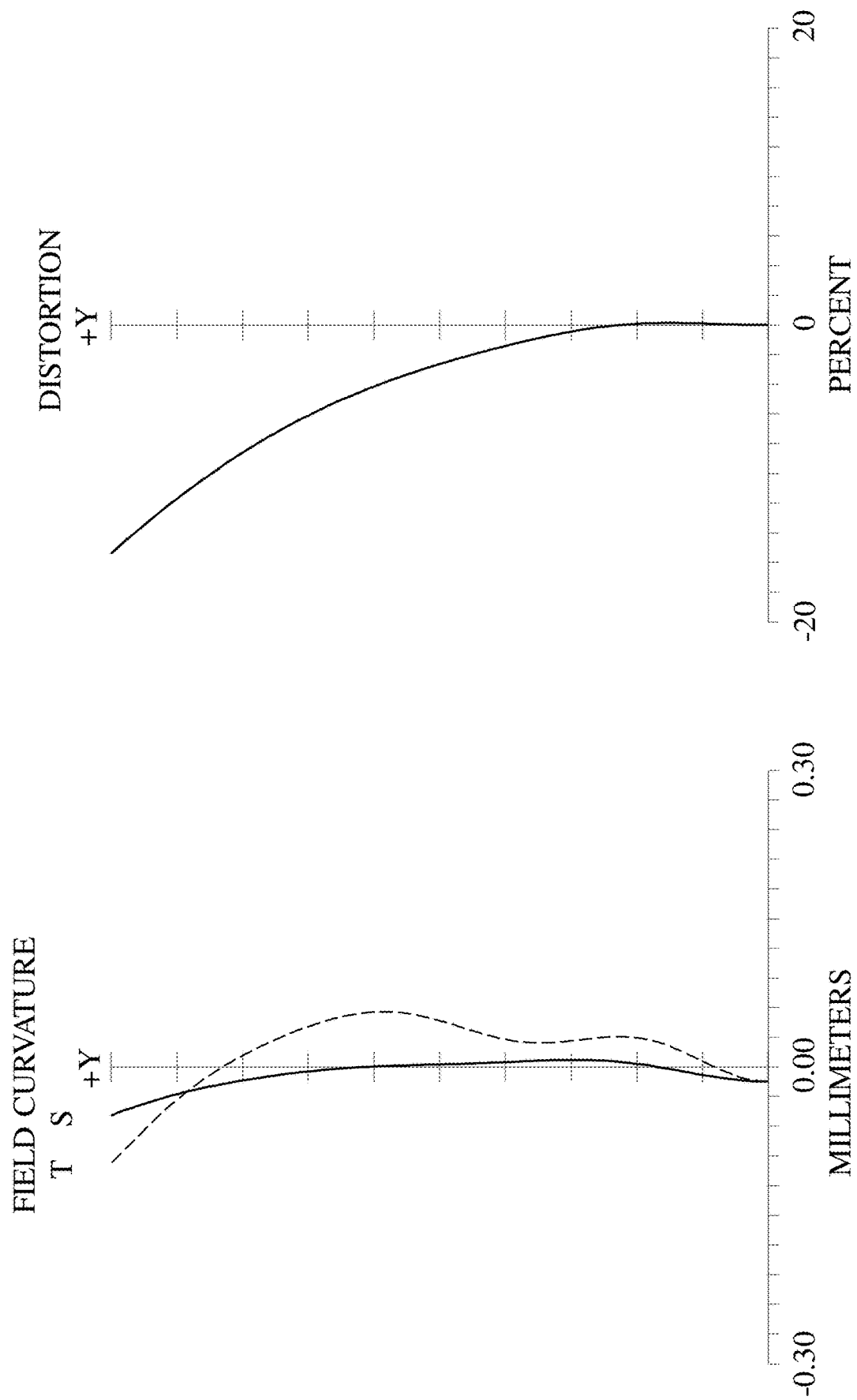
FIG. 5B shows the image plane curve and the distortion curve of the fifth embodiment of the present invention.

Referring to FIGS. 5A and 5B, FIG. 5A shows an infrared projection lens assembly in accordance with a fifth embodiment of the present invention, and FIG. 5B shows, in order from left to right, the image plane curve and the distortion curve of the fifth embodiment of the present invention. An infrared projection lens assembly in accordance with the fifth embodiment of the present invention comprises, in order from an image side to an image source side: a stop 500, a first lens 510, a second lens 520, a third lens 530, and an image source plane 580. Wherein the stop 500 is disposed between an object (not shown) and the first lens 510. The infrared projection lens assembly has a total of three lenses with refractive power.

The first lens 510 with positive refractive power, comprising an image-side surface 511 and an image source-side surface 512, the image-side surface 511 of the first lens 510 being concave near the optical axis 590 and the image source-side surface 512 of the first lens 510 being convex near the optical axis 590, the image-side surface 511 and the image source-side surface 512 of the first lens 510 are aspheric, and the first lens 510 is made of plastic material.

The second lens 520 with negative refractive power, comprising an image-side surface 521 and an image source-side surface 522, the image-side surface 521 of the second lens 520 being concave near the optical axis 590 and the image source-side surface 522 of the second lens 520 being convex near the optical axis 590, the image-side surface 521 and the image source-side surface 522 of the second lens 520 are aspheric, and the second lens 520 is made of plastic material.

The third lens 530 with positive refractive power, comprising an image-side surface 531 and an image source-side surface 532, the image-side surface 531 of the third lens 530 being convex near the optical axis 590 and the image source-side surface 532 of the third lens 530 being convex near the optical axis 590, the image-side surface 531 and the image source-side surface 532 of the third lens 530 are aspheric, and the third lens 530 is made of plastic material.

The detailed optical data of the fifth embodiment is shown in table 9, and the aspheric surface data is shown in table 10.

TABLE 9

Embodiment 5
f(focal length) = 2.53 mm, Fno = 2.61, FOV = 73.6 deg.

| surface | | Curvature Radius | Thickness/gap | Material | Index (nd) | Abbe # (vd) | Focal length |
|---|---|---|---|---|---|---|---|
| 0 | object | infinity | infinity | | | | |
| 1 | stop | infinity | 0.126 | | | | |
| 2 | Lens 1 | −9.775 (ASP) | 1.003 | plastic | 1.643 | 22.5 | 3.82 |
| 3 | | −1.977 (ASP) | 0.662 | | | | |
| 4 | Lens 2 | −0.684 (ASP) | 0.880 | plastic | 1.643 | 22.5 | −105.24 |
| 5 | | −1.031 (ASP) | 0.033 | | | | |
| 6 | Lens 3 | 3.553 (ASP) | 1.469 | plastic | 1.643 | 22.5 | 4.92 |
| 7 | | −17.987 (ASP) | 2.063 | | | | |
| 8 | Image source plane | infinity | — | | | | |

Note:
reference wavelength is 940 nm

TABLE 10

Aspheric Coefficients

| surface | 2 | 3 | 4 | 5 | 6 | 7 |
|---|---|---|---|---|---|---|
| K: | −6.2917E+01 | 1.6878E+00 | −8.0481E−01 | −1.0305E+00 | −8.6108E+00 | 3.1033E+01 |
| A2: | 0.0000E+00 | 0.0000E+00 | 0.0000E+00 | 0.0000E+00 | 0.0000E+00 | 0.0000E+00 |
| A4: | 6.4279E−02 | 1.4099E−02 | −4.3750E−02 | 9.0210E−03 | 4.0435E−02 | −3.8590E−02 |
| A6: | −1.6275E+00 | −1.6561E−01 | −1.6544E−01 | −7.1170E−02 | −1.3060E−02 | 3.5099E−02 |
| A8: | 1.0685E+01 | 4.2693E−01 | 8.3181E−01 | 1.1200E−01 | 4.4900E−04 | −1.7860E−02 |
| A10: | −3.6300E+01 | −4.9321E−01 | −1.5902E+00 | −9.9610E−02 | 8.0000E−04 | 4.8910E−03 |
| A12: | 6.2104E+01 | 2.2500E−01 | 1.4444E+00 | 4.2574E−02 | −1.9000E−04 | −6.9000E−04 |
| A14: | −4.4027E+01 | 1.2170E−03 | −4.4742E−01 | −6.4600E−03 | 1.2300E−05 | 3.8300E−05 |
| A16: | 0.0000E+00 | 0.0000E+00 | 0.0000E+00 | 0.0000E+00 | 0.0000E+00 | 0.0000E+00 |

In the fifth embodiment, the equation of the aspheric surface profiles of the aforementioned lenses is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | | | |
|---|---|---|---|
| f[mm] | 2.53 | f2/CT2 | −119.59 |
| Fno | 2.61 | CT1/CT2 | 1.14 |
| FOV[deg.] | 73.6 | CT3/CT2 | 1.29 |
| EPD[mm] | 0.97 | TD/T23 | 122.70 |
| R1/(sin(HFOV)*f) | −6.45 | f1/f2 | −0.04 |
| FOV/f [*/mm] | 29.10 | f1/f3 | 0.78 |
| R2/R3 | 2.89 | f/f2 | −0.02 |
| R1/R5 | −2.75 | SD/TL | 0.68 |
| R1/EPD | −10.07 | R2/R6 | 0.11 |
| R5/EPD | 3.66 | CT3/R5 | 0.41 |
| R1*(TL/f) [mm] | −23.62 | TD/TL | 0.66 |
| f2/f3 | −21.38 | CT2/TL | 0.14 |
| f3/EPD | 5.07 | BFL/TL | 0.34 |
| TD/f | 1.60 | CT2/CT3 | 0.60 |

Figure 6A:
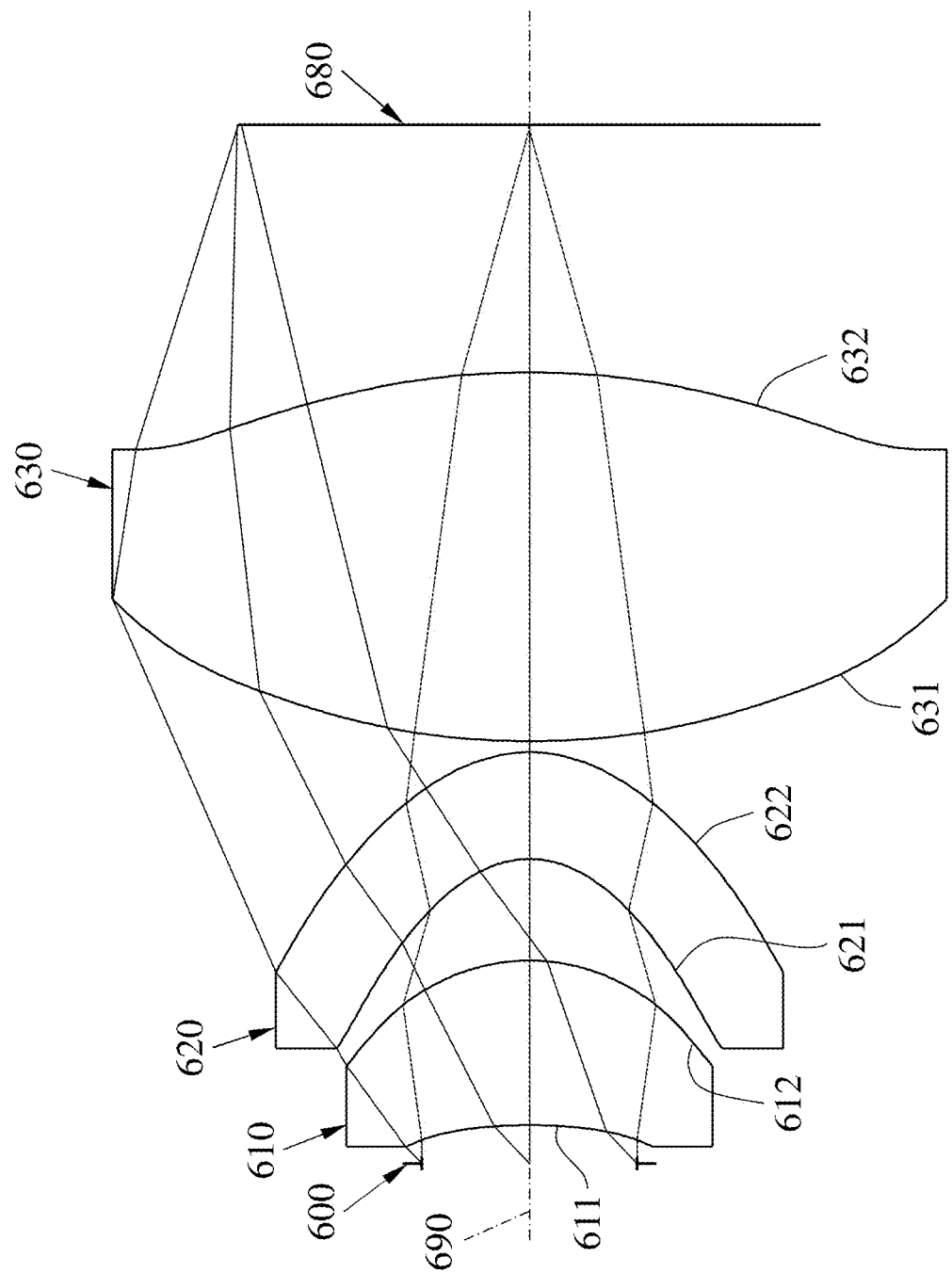
FIG. 6A shows an infrared projection lens assembly in accordance with a sixth embodiment of the present invention.
Figure 6B:
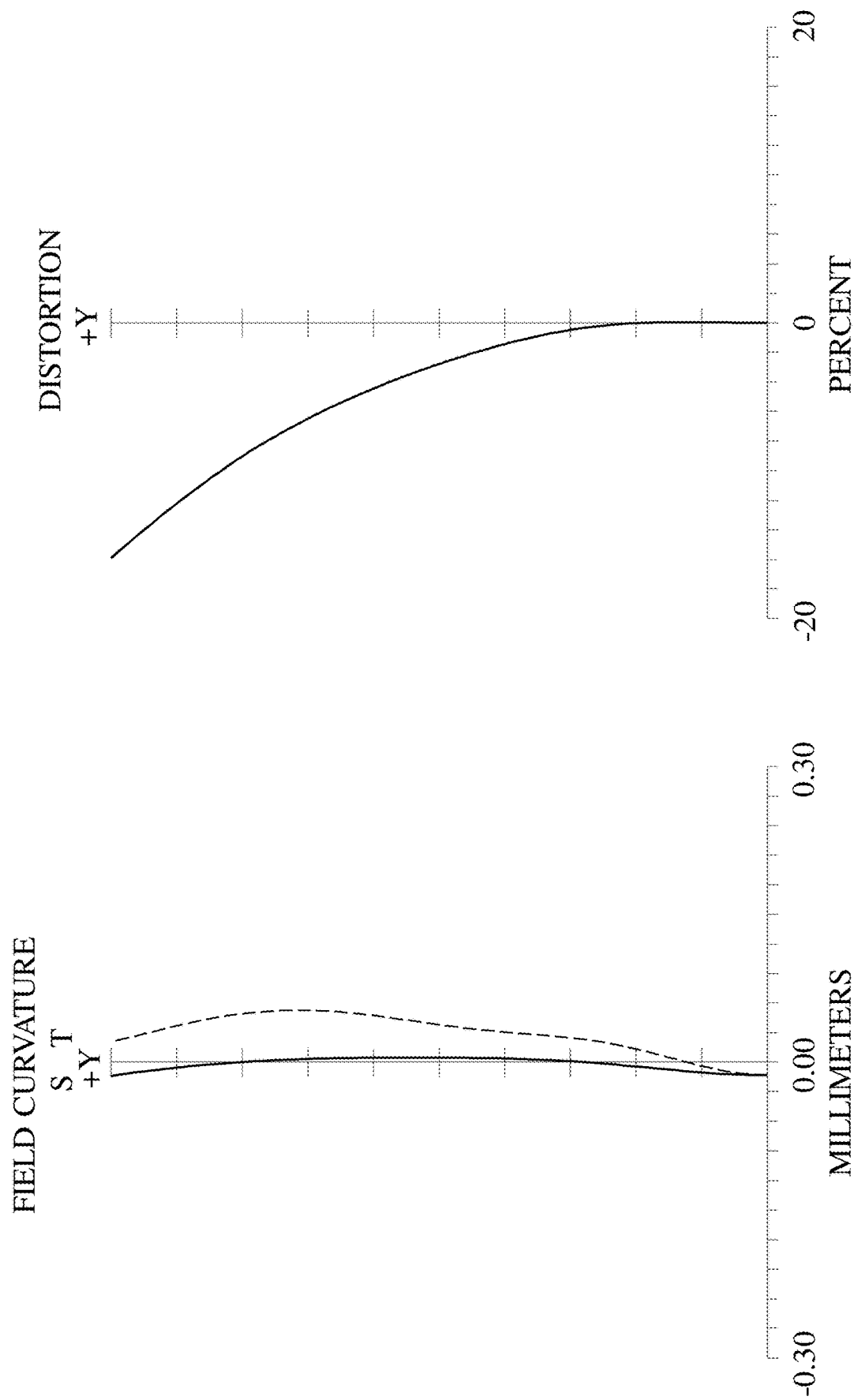
FIG. 6B shows the image plane curve and the distortion curve of the sixth embodiment of the present invention.

Referring to FIGS. 6A and 6B, FIG. 6A shows an infrared projection lens assembly in accordance with a sixth embodiment of the present invention, and FIG. 6B shows, in order from left to right, the image plane curve and the distortion curve of the sixth embodiment of the present invention. An infrared projection lens assembly in accordance with the sixth embodiment of the present invention comprises, in order from an image side to an image source side: a stop 600, a first lens 610, a second lens 620, a third lens 630, and an image source plane 680. Wherein the stop 600 is disposed between an object (not shown) and the first lens 610. The infrared projection lens assembly has a total of three lenses with refractive power.

The first lens 610 with positive refractive power, comprising an image-side surface 611 and an image source-side surface 612, the image-side surface 611 of the first lens 610 being concave near the optical axis 690 and the image source-side surface 612 of the first lens 610 being convex near the optical axis 690, the image-side surface 611 and the image source-side surface 612 of the first lens 610 are aspheric, and the first lens 610 is made of plastic material.

The second lens 620 with negative refractive power, comprising an image-side surface 621 and an image source-side surface 622, the image-side surface 621 of the second lens 620 being concave near the optical axis 690 and the image source-side surface 622 of the second lens 620 being convex near the optical axis 690, the image-side surface 621 and the image source-side surface 622 of the second lens 620 are aspheric, and the second lens 620 is made of plastic material.

The third lens 630 with positive refractive power, comprising an image-side surface 631 and an image source-side surface 632, the image-side surface 631 of the third lens 630 being convex near the optical axis 690 and the image source-side surface 632 of the third lens 630 being convex near the optical axis 690, the image-side surface 631 and the image source-side surface 632 of the third lens 630 are aspheric, and the third lens 630 is made of plastic material.

The detailed optical data of the sixth embodiment is shown in table 11, and the aspheric surface data is shown in table 12.

TABLE 11

Embodiment 6
f(focal length) = 1.14 mm, Fno = 1.83, FOV = 76.0 deg.

| surface | | Curvature Radius | Thickness/gap | Material | Index (nd) | Abbe # (vd) | Focal length |
|---|---|---|---|---|---|---|---|
| 0 | object | infinity | 600 | | | | |
| 1 | stop | infinity | 0.111 | | | | |
| 2 | Lens 1 | −1.471 (ASP) | 0.474 | plastic | 1.643 | 22.5 | 1.24 |
| 3 | | −0.565 (ASP) | 0.293 | | | | |
| 4 | Lens 2 | −0.280 (ASP) | 0.308 | plastic | 1.643 | 22.5 | −6.46 |
| 5 | | −0.427 (ASP) | 0.032 | | | | |
| 6 | Lens 3 | 2.404 (ASP) | 1.063 | plastic | 1.643 | 22.5 | 2.20 |
| 7 | | −2.597 (ASP) | 0.715 | | | | |
| 8 | Image source plane | infinity | — | | | | |

Note:
reference wavelength is 940 nm

TABLE 12

Aspheric Coefficients

| surface | 2 | 3 | 4 | 5 | 6 | 7 |
|---|---|---|---|---|---|---|
| K: | −1.0606E+00 | −1.4113E−01 | −8.0249E−01 | −1.1312E+00 | −1.2935E+01 | 1.8657E+00 |
| A2: | 0.0000E+00 | 0.0000E+00 | 0.0000E+00 | 0.0000E+00 | 0.0000E+00 | 0.0000E+00 |
| A4: | 2.4381E−01 | 6.5441E−01 | 1.7799E+00 | 1.2642E−01 | 2.5109E−01 | −2.5810E−01 |
| A6: | −4.4288E+01 | −5.4653E+00 | −1.0137E+01 | −2.0910E+00 | −3.1549E−01 | 1.0357E+00 |
| A8: | 9.2107E+02 | 2.5031E+01 | 1.0454E+02 | 1.0891E+01 | 5.1997E−02 | −1.7543E+00 |
| A10: | −1.1087E+04 | −5.4529E+01 | −4.9548E+02 | −3.2261E+01 | 2.5555E−01 | 1.5195E+00 |
| A12: | 6.7598E+04 | 1.5006E+02 | 1.3701E+03 | 4.4222E+01 | −1.9441E−01 | −6.8059E−01 |
| A14: | −1.8906E+05 | −1.0416E+03 | −2.3129E+03 | −2.4144E+01 | 4.4594E−02 | 1.9464E−01 |
| A16: | 1.8712E+05 | 2.8519E+03 | 2.5689E+03 | 3.2783E+00 | −1.4533E−03 | −4.0306E−02 |

In the sixth embodiment, the equation of the aspheric surface profiles of the aforementioned lenses is the same as the equation of the first embodiment. Also, the definitions of these parameters shown in the following table are the same as those stated in the first embodiment with corresponding values for the sixth embodiment, so an explanation in this regard will not be provided again.

Moreover, these parameters can be calculated from Table 11 and Table 12 as the following values and satisfy the following conditions:

| Embodiment 6 | | | |
|---|---|---|---|
| f[mm] | 1.14 | f2/CT2 | −20.96 |
| Fno | 1.83 | CT1/CT2 | 1.54 |
| FOV[deg.] | 76.0 | CT3/CT2 | 1.77 |
| EPD[mm] | 0.63 | TD/T23 | 68.06 |
| R1/(sin(HFOV)*f) | −2.09 | f1/f2 | −0.19 |
| FOV/f [*/mm] | 66.51 | f1/f3 | 0.56 |
| R2/R3 | 2.02 | f/f2 | −0.18 |
| R1/R5 | −0.61 | SD/TL | 0.79 |
| R1/EPD | −2.35 | R2/R6 | 0.22 |
| R5/EPD | 3.84 | CT3/R5 | 0.44 |
| R1*(TL/f) [mm] | −3.71 | TD/TL | 0.75 |
| f2/f3 | −2.94 | CT2/TL | 0.11 |
| f3/EPD | 3.51 | BFL/TL | 0.25 |
| TD/f | 1.90 | CT2/CT3 | 0.29 |

Figure 7A:
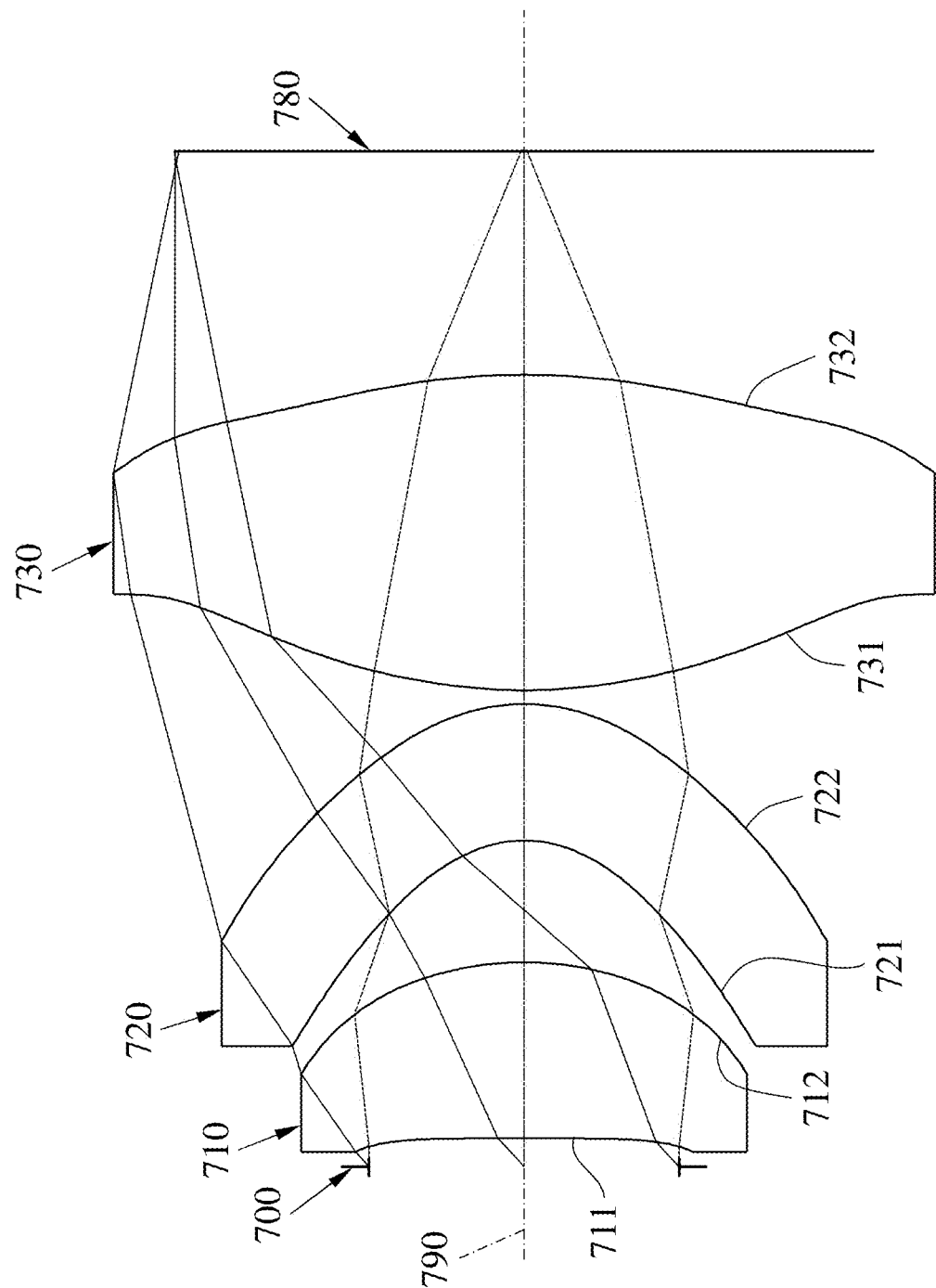
FIG. 7A shows an infrared projection lens assembly in accordance with a seventh embodiment of the present invention.
Figure 7B:
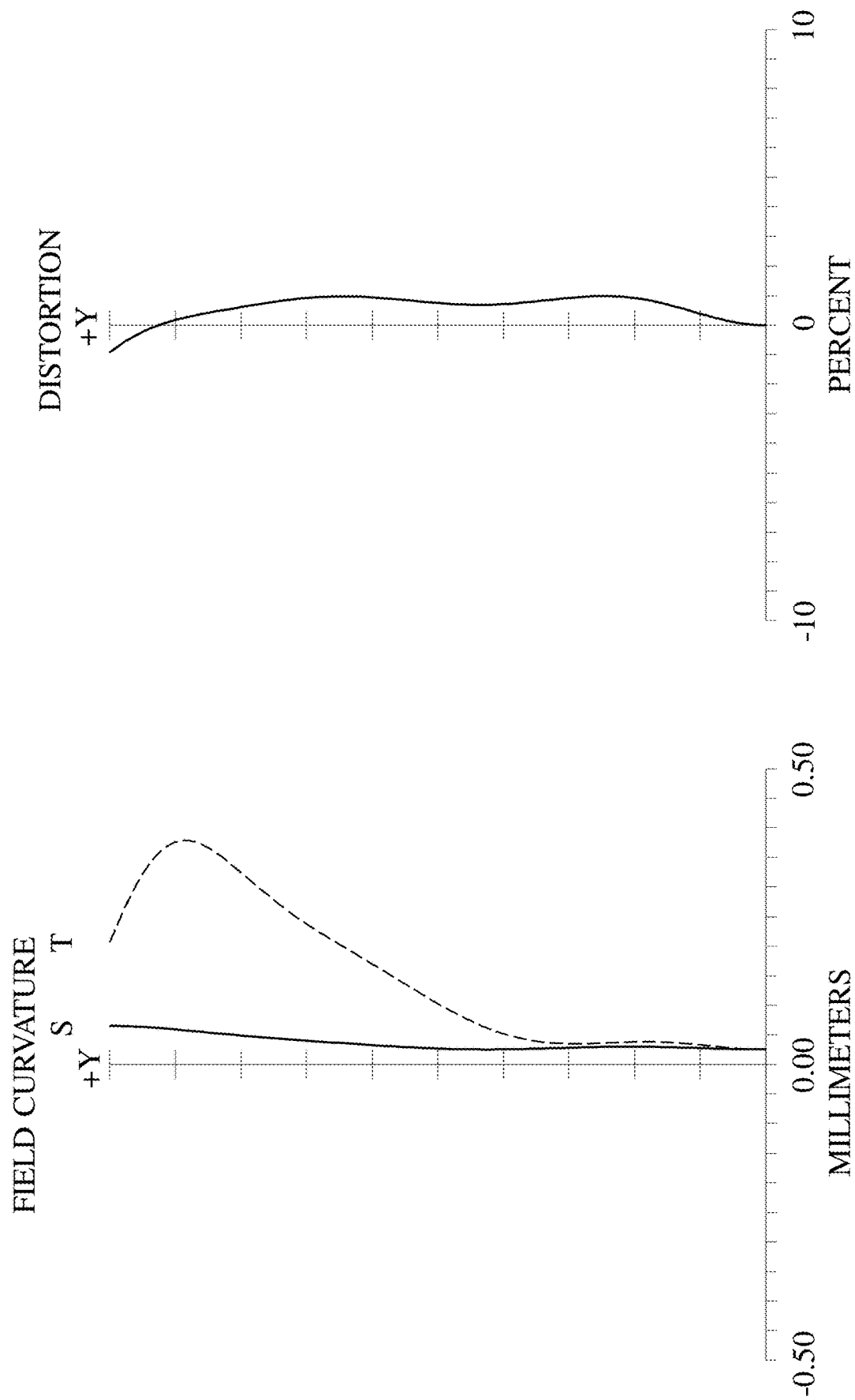
FIG. 7B shows the image plane curve and the distortion curve of the seventh embodiment of the present invention.

Referring to FIGS. 7A and 7B, FIG. 7A shows an infrared projection lens assembly in accordance with a seventh embodiment of the present invention, and FIG. 7B shows, in order from left to right, the image plane curve and the distortion curve of the seventh embodiment of the present invention. An infrared projection lens assembly in accordance with the seventh embodiment of the present invention comprises, in order from an image side to an image source side: a stop 700, a first lens 710, a second lens 720, a third lens 730, and an image source plane 780. Wherein the stop 700 is disposed between an object (not shown) and the first lens 710. The infrared projection lens assembly has a total of three lenses with refractive power.

The first lens 710 with positive refractive power, comprising an image-side surface 711 and an image source-side surface 712, the image-side surface 711 of the first lens 710 being concave near the optical axis 790 and the image source-side surface 712 of the first lens 710 being convex near the optical axis 790, the image-side surface 711 and the image source-side surface 712 of the first lens 710 are aspheric, and the first lens 710 is made of plastic material.

The second lens 720 with negative refractive power, comprising an image-side surface 721 and an image source-side surface 722, the image-side surface 721 of the second lens 720 being concave near the optical axis 790 and the image source-side surface 722 of the second lens 720 being convex near the optical axis 790, the image-side surface 721 and the image source-side surface 722 of the second lens 720 are aspheric, and the second lens 720 is made of plastic material.

The third lens 730 with positive refractive power, comprising an image-side surface 731 and an image source-side surface 732, the image-side surface 731 of the third lens 730 being convex near the optical axis 790 and the image source-side surface 732 of the third lens 730 being convex near the optical axis 790, the image-side surface 731 and the image source-side surface 732 of the third lens 730 are aspheric, and the third lens 730 is made of plastic material.

The detailed optical data of the seventh embodiment is shown in table 13, and the aspheric surface data is shown in table 14.

TABLE 13

Embodiment 7
f(focal length) = 0.97 mm, Fno = 1.28, FOV = 76.0 deg.

| surface | | Curvature Radius | Thickness/gap | Material | Index (nd) | Abbe # (vd) | Focal length |
|---|---|---|---|---|---|---|---|
| 0 | object | infinity | 600 | | | | |
| 1 | stop | infinity | 0.070 | | | | |
| 2 | Lens 1 | −9.015 (ASP) | 0.425 | plastic | 1.643 | 22.5 | 1.39 |
| 3 | | −0.797 (ASP) | 0.294 | | | | |
| 4 | Lens 2 | −0.304 (ASP) | 0.329 | plastic | 1.643 | 22.5 | −5.34 |
| 5 | | −0.474 (ASP) | 0.033 | | | | |
| 6 | Lens 3 | 1.310 (ASP) | 0.761 | plastic | 1.643 | 22.5 | 1.37 |
| 7 | | −1.866 (ASP) | 0.540 | | | | |
| 8 | Image source plane | infinity | — | | | | |

Note:
reference wavelength is 940 nm

TABLE 14

Aspheric Coefficients

| surface | 2 | 3 | 4 | 5 | 6 | 7 |
|---|---|---|---|---|---|---|
| K: | 1.0428E+02 | 4.0339E−01 | −9.4205E−01 | −1.0318E+00 | −6.3598E+00 | −7.4672E+01 |
| A2: | 0.0000E+00 | 0.0000E+00 | 0.0000E+00 | 0.0000E+00 | 0.0000E+00 | 0.0000E+00 |
| A4: | 2.8405E+00 | −1.0632E+00 | 4.3070E−01 | −9.2765E−02 | −2.2142E−01 | −1.2979E+00 |
| A6: | −8.2218E+01 | 5.6090E+01 | −1.6601E+01 | −5.0550E+00 | 2.5959E+00 | 6.6216E+00 |
| A8: | 5.3431E+02 | −1.1171E+03 | 3.3258E+02 | 7.7527E+01 | −8.5412E+00 | −2.0474E+01 |
| A10: | 1.1837E+04 | 1.1144E+04 | −2.8349E+03 | −4.4271E+02 | 1.4973E+01 | 4.4941E+01 |
| A12: | −2.9496E+05 | −6.4635E+04 | 1.3639E+04 | 1.3674E+03 | −1.5860E+01 | −6.9219E+01 |
| A14: | 2.8558E+06 | 2.2716E+05 | −3.9450E+04 | −2.5131E+03 | 1.0169E+01 | 7.0343E+01 |
| A16: | −1.4486E+07 | −4.7813E+05 | 6.7014E+04 | 2.7394E+03 | −4.0873E+00 | −4.4432E+01 |
| A20: | 3.7736E+07 | 5.5765E+05 | −6.0578E+04 | −1.6418E+03 | 9.7767E−01 | 1.5736E+01 |

In the seventh embodiment, the equation of the aspheric surface profiles of the aforementioned lenses is the same as the equation of the first embodiment. Also, the definitions of these parameters shown in the following table are the same as those stated in the first embodiment with corresponding values for the seventh embodiment, so an explanation in this regard will not be provided again.

Moreover, these parameters can be calculated from Table 13 and Table 14 as the following values and satisfy the following conditions:

| Embodiment 7 | | | |
|---|---|---|---|
| f[mm] | 0.97 | f2/CT2 | −16.22 |
| Fno | 1.28 | CT1/CT2 | 1.29 |
| FOV[deg.] | 76.0 | CT3/CT2 | 0.99 |
| EPD[mm] | 0.75 | TD/T23 | 55.12 |
| R1/(sin(HFOV)*f) | −15.17 | f1/f2 | −0.26 |
| FOV/f [*/mm] | 78.68 | f1/f3 | 1.01 |
| R2/R3 | 2.62 | f/f2 | −0.18 |
| R1/R5 | −6.88 | SD/TL | 0.80 |
| R1/EPD | −11.95 | R2/R6 | 0.43 |
| R5/EPD | 1.74 | CT3/R5 | 0.58 |
| R1*(TL/f) [mm] | −22.24 | TD/TL | 0.77 |
| f2/f3 | −3.90 | CT2/TL | 0.14 |
| f3/EPD | 1.82 | BFL/TL | 0.23 |
| TD/f | 1.91 | CT2/CT3 | 0.43 |

Figure 8A:
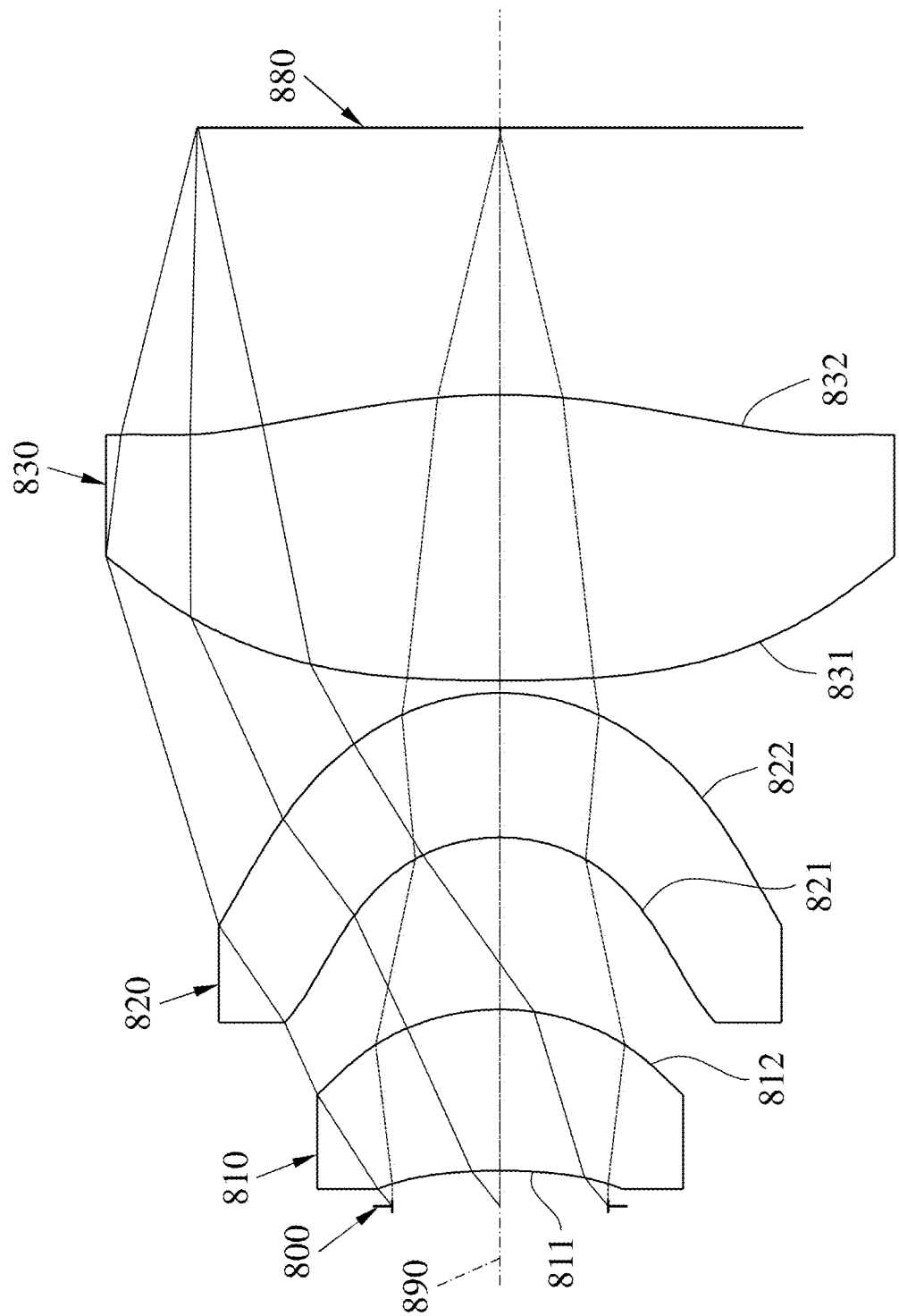
FIG. 8A shows an infrared projection lens assembly in accordance with an eighth embodiment of the present invention.
Figure 8B:
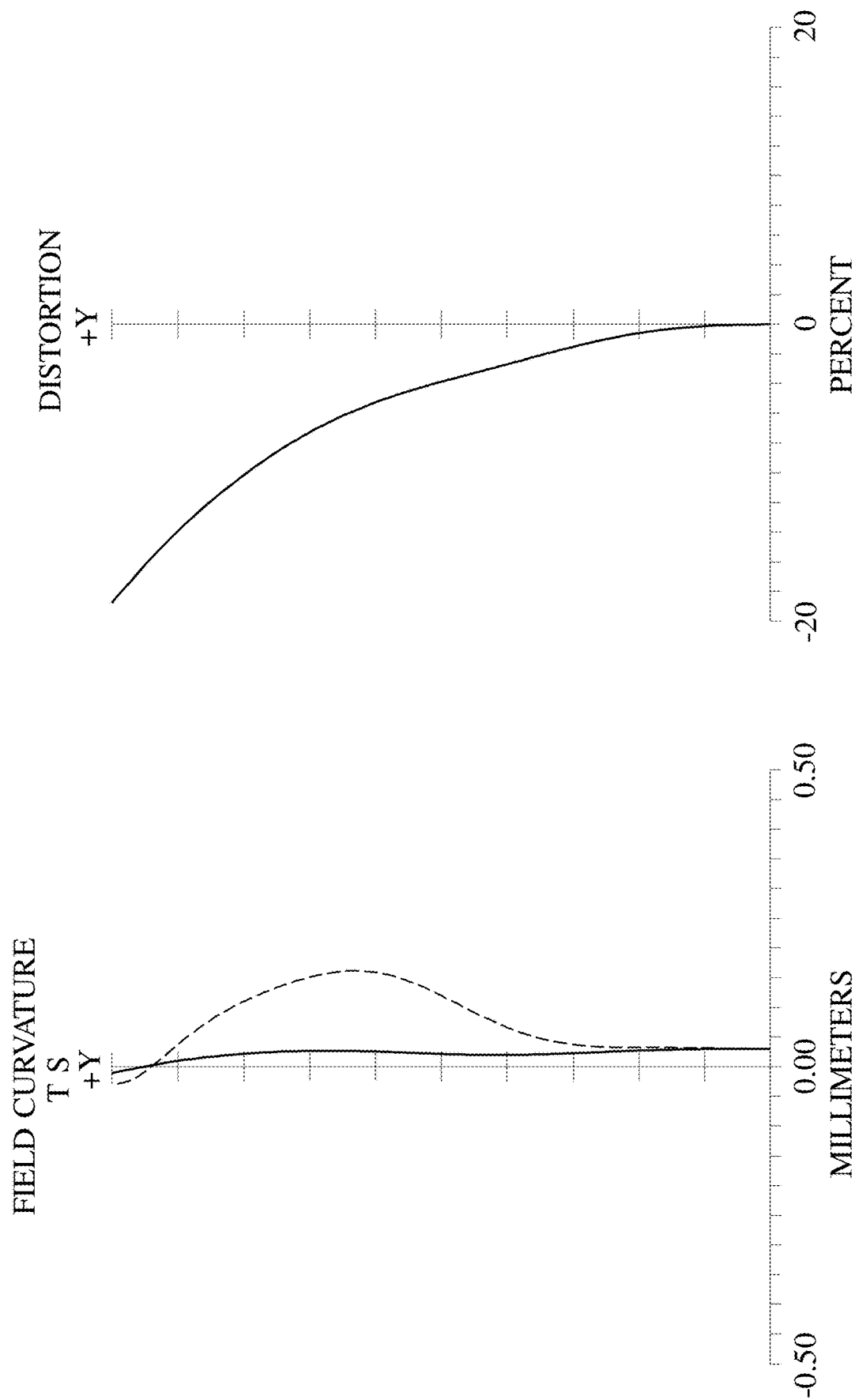
FIG. 8B shows the image plane curve and the distortion curve of the eighth embodiment of the present invention.

Referring to FIGS. 8A and 8B, FIG. 8A shows an infrared projection lens assembly in accordance with an eighth embodiment of the present invention, and FIG. 8B shows, in order from left to right, the image plane curve and the distortion curve of the eighth embodiment of the present invention. An infrared projection lens assembly in accordance with the eighth embodiment of the present invention comprises, in order from an image side to an image source side: a stop 800, a first lens 810, a second lens 820, a third lens 830, and an image source plane 880. Wherein the stop 800 is disposed between an object (not shown) and the first lens 810. The infrared projection lens assembly has a total of three lenses with refractive power.

The first lens 810 with positive refractive power, comprising an image-side surface 811 and an image source-side surface 812, the image-side surface 811 of the first lens 810 being concave near the optical axis 890 and the image source-side surface 812 of the first lens 810 being convex near the optical axis 890, the image-side surface 811 and the image source-side surface 812 of the first lens 810 are aspheric, and the first lens 810 is made of plastic material.

The second lens 820 with positive refractive power, comprising an image-side surface 821 and an image source-side surface 822, the image-side surface 821 of the second lens 820 being concave near the optical axis 890 and the image source-side surface 822 of the second lens 820 being convex near the optical axis 890, the image-side surface 821 and the image source-side surface 822 of the second lens 820 are aspheric, and the second lens 820 is made of plastic material.

The third lens 830 with positive refractive power, comprising an image-side surface 831 and an image source-side surface 832, the image-side surface 831 of the third lens 830 being convex near the optical axis 890 and the image source-side surface 832 of the third lens 830 being convex near the optical axis 890, the image-side surface 831 and the image source-side surface 832 of the third lens 830 are aspheric, and the third lens 830 is made of plastic material.

The detailed optical data of the eighth embodiment is shown in table 15, and the aspheric surface data is shown in table 16.

TABLE 15

Embodiment 8
f(focal length) = 1.28 mm, Fno = 2.11, FOV = 78.6 deg.

| surface | | Curvature Radius | Thickness/gap | Material | Index (nd) | Abbe # (vd) | Focal length |
|---|---|---|---|---|---|---|---|
| 0 | object | infinity | 600 | | | | |
| 1 | stop | infinity | 0.100 | | | | |
| 2 | Lens 1 | −1.544 (ASP) | 0.447 | plastic | 1.643 | 22.5 | 1.64 |
| 3 | | −0.681 (ASP) | 0.478 | | | | |
| 4 | Lens 2 | −0.519 (ASP) | 0.401 | plastic | 1.643 | 22.5 | 23.35 |
| 5 | | −0.649 (ASP) | 0.035 | | | | |
| 6 | Lens 3 | 6.028 (ASP) | 0.794 | plastic | 1.643 | 22.5 | 2.48 |
| 7 | | −1.953 (ASP) | 0.743 | | | | |
| 8 | Image source plane | infinity | — | | | | |

Note:
reference wavelength is 940 nm

TABLE 16

Aspheric Coefficients

| surface | 2 | 3 | 4 | 5 | 6 | 7 |
|---|---|---|---|---|---|---|
| K: | −1.2882E+01 | 6.3574E−01 | −6.3032E−01 | −7.9835E−01 | 1.2824E+01 | −2.9150E+01 |
| A2: | 0.0000E+00 | 0.0000E+00 | 0.0000E+00 | 0.0000E+00 | 0.0000E+00 | 0.0000E+00 |
| A4: | 9.4076E−02 | 3.9398E−01 | −1.1936E+00 | −2.3674E−01 | 3.3890E−01 | −2.7340E−01 |
| A6: | −4.4931E+01 | −3.3618E+00 | −7.2354E+00 | −1.2366E+00 | −2.9319E−01 | 9.1826E−01 |
| A8: | 8.8443E+02 | 3.3334E+01 | 7.2604E+01 | 8.7894E+00 | 4.5279E−02 | −1.5009E+00 |
| A10: | −1.1009E+04 | −1.6767E+02 | −4.9093E+02 | −3.1535E+01 | 2.3967E−01 | 1.5116E+00 |
| A12: | 7.2510E+04 | 2.2446E+02 | 1.6241E+03 | 4.8237E+01 | −2.0516E−01 | −7.8095E−01 |
| A14: | −1.9095E+05 | 8.9764E+02 | −1.7848E+03 | −2.5170E+01 | 4.5873E−02 | 1.4602E−01 |

In the eighth embodiment, the equation of the aspheric surface profiles of the aforementioned lenses is the same as the equation of the first embodiment. Also, the definitions of these parameters shown in the following table are the same as those stated in the first embodiment with corresponding values for the eighth embodiment, so an explanation in this regard will not be provided again.

Moreover, these parameters can be calculated from Table 15 and Table 16 as the following values and satisfy the following conditions:

| Embodiment 8 | | | |
|---|---|---|---|
| f[mm] | 1.28 | f2/CT2 | 58.28 |
| Fno | 2.11 | CT1/CT2 | 1.12 |
| FOV[deg.] | 78.6 | CT3/CT2 | 1.51 |
| EPD[mm] | 0.61 | TD/T23 | 62.24 |
| R1/(sin(HFOV)*f) | −1.91 | f1/f2 | 0.07 |
| FOV/f [*/mm] | 61.58 | f1/f3 | 0.66 |
| R2/R3 | 1.31 | f/f2 | 0.05 |
| R1/R5 | −0.26 | SD/TL | 0.78 |
| R1/EPD | −2.55 | R2/R6 | 0.35 |
| R5/EPD | 9.96 | CT3/R5 | 0.13 |
| R1*(TL/f) [mm] | −3.50 | TD/TL | 0.74 |
| f2/f3 | 9.42 | CT2/TL | 0.14 |
| f3/EPD | 4.09 | BFL/TL | 0.26 |
| TD/f | 1.69 | CT2/CT3 | 0.50 |

Figure 9A:
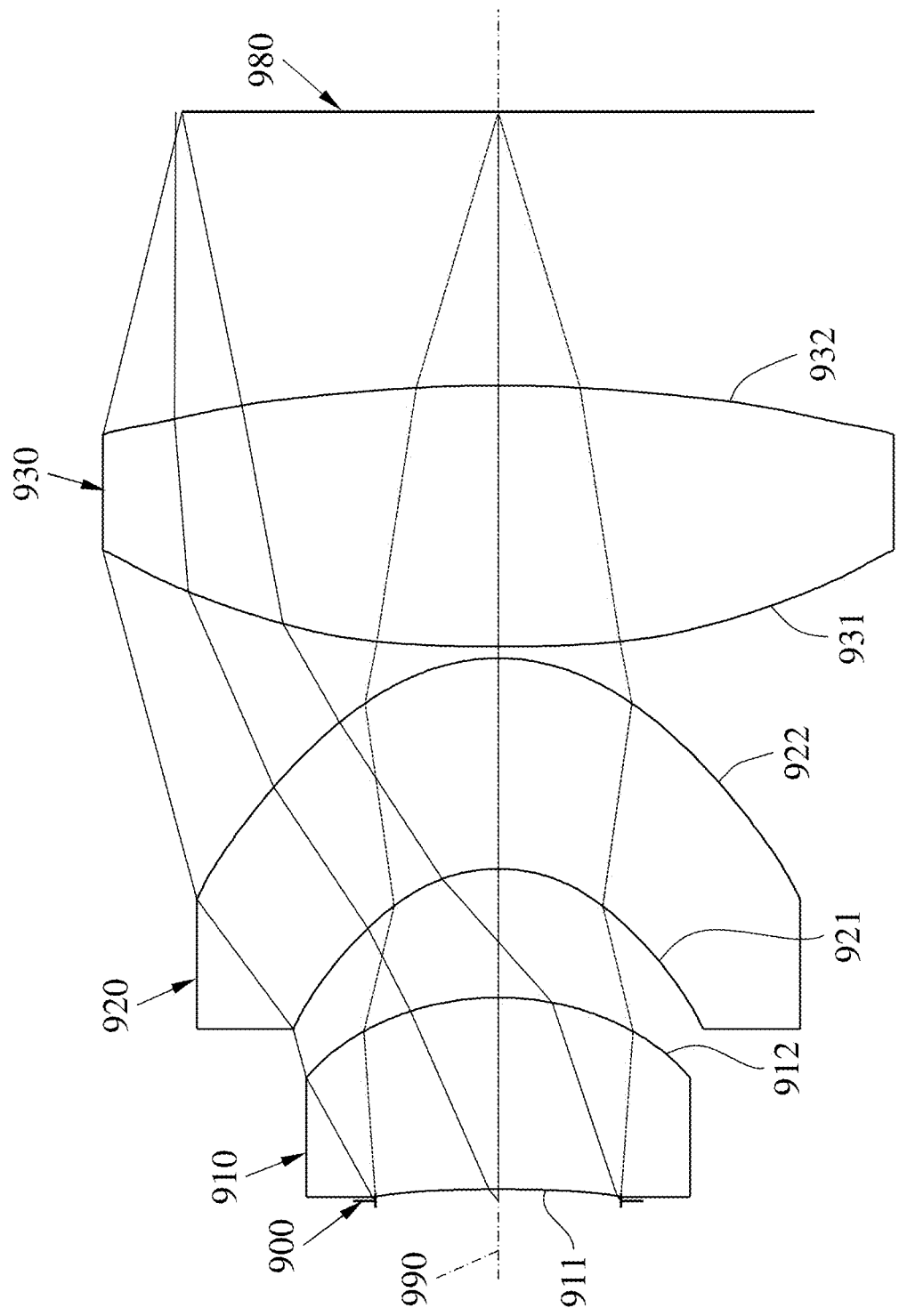
FIG. 9A shows an infrared projection lens assembly in accordance with a ninth embodiment of the present invention.
Figure 9B:
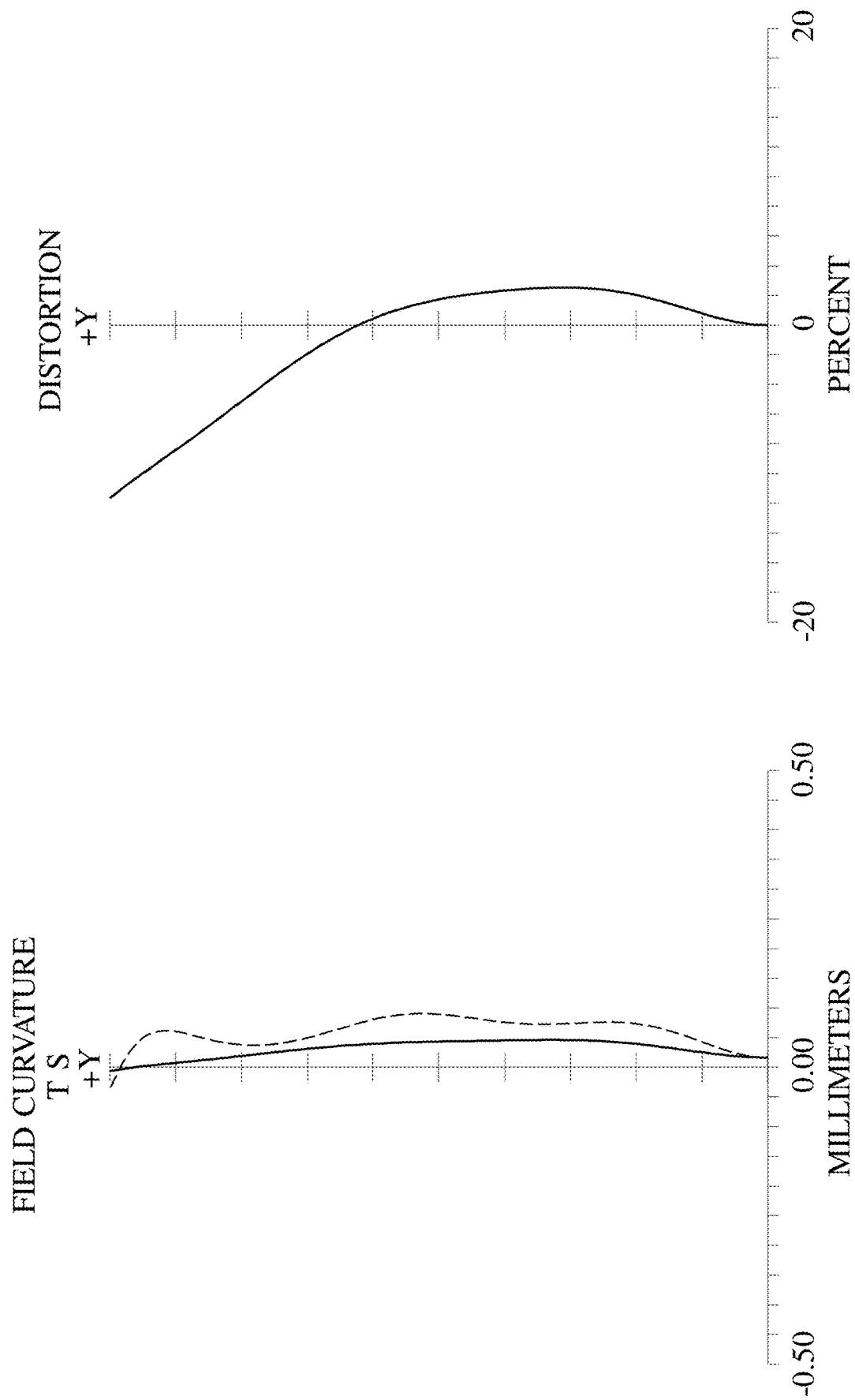
FIG. 9B shows the image plane curve and the distortion curve of the ninth embodiment of the present invention.

Referring to FIGS. 9A and 9B, FIG. 9A shows an infrared projection lens assembly in accordance with a ninth embodiment of the present invention, and FIG. 9B shows, in order from left to right, the image plane curve and the distortion curve of the ninth embodiment of the present invention. An infrared projection lens assembly in accordance with the ninth embodiment of the present invention comprises, in order from an image side to an image source side: a stop 900, a first lens 910, a second lens 920, a third lens 930, and an image source plane 980. Wherein the stop 900 is disposed between an object (not shown) and the first lens 910. The infrared projection lens assembly has a total of three lenses with refractive power.

The first lens 910 with positive refractive power, comprising an image-side surface 911 and an image source-side surface 912, the image-side surface 911 of the first lens 910 being concave near the optical axis 990 and the image source-side surface 912 of the first lens 910 being convex near the optical axis 990, the image-side surface 911 and the image source-side surface 912 of the first lens 910 are aspheric, and the first lens 910 is made of plastic material.

The second lens 920 with positive refractive power, comprising an image-side surface 921 and an image source-side surface 922, the image-side surface 921 of the second lens 920 being concave near the optical axis 990 and the image source-side surface 922 of the second lens 920 being convex near the optical axis 990, the image-side surface 921 and the image source-side surface 922 of the second lens 920 are aspheric, and the second lens 920 is made of plastic material.

The third lens 930 with positive refractive power, comprising an image-side surface 931 and an image source-side surface 932, the image-side surface 931 of the third lens 930 being convex near the optical axis 990 and the image source-side surface 932 of the third lens 930 being convex near the optical axis 990, the image-side surface 931 and the image source-side surface 932 of the third lens 930 are aspheric, and the third lens 930 is made of plastic material.

The detailed optical data of the ninth embodiment is shown in table 17, and the aspheric surface data is shown in table 18.

TABLE 17

Embodiment 9
f(focal length) = 1.13 mm, Fno = 1.74, FOV = 81.0 deg.

| surface | | Curvature Radius | Thickness/gap | Material | Index (nd) | Abbe # (vd) | Focal length |
|---|---|---|---|---|---|---|---|
| 0 | object | infinity | 600 | | | | |
| 1 | stop | infinity | 0.030 | | | | |
| 2 | Lens 1 | −3.741 (ASP) | 0.500 | plastic | 1.643 | 22.5 | 1.47 |
| 3 | | −0.770 (ASP) | 0.336 | | | | |
| 4 | Lens 2 | −0.428 (ASP) | 0.550 | plastic | 1.643 | 22.5 | 3.42 |
| 5 | | −0.531 (ASP) | 0.030 | | | | |
| 6 | Lens 3 | 4.577 (ASP) | 0.682 | plastic | 1.643 | 22.5 | 3.47 |
| 7 | | −3.808 (ASP) | 0.714 | | | | |
| 8 | Image source plane | infinity | — | | | | |

Note:
reference wavelength is 940 nm

TABLE 18

Aspheric Coefficients

| surface | 2 | 3 | 4 | 5 | 6 | 7 |
|---|---|---|---|---|---|---|
| K: | −2.7157E+02 | 7.9206E−01 | −6.2303E−01 | −1.2592E+00 | −5.0002E+02 | 5.9234E+00 |
| A2: | 0.0000E+00 | 0.0000E+00 | 0.0000E+00 | 0.0000E+00 | 0.0000E+00 | 0.0000E+00 |
| A4: | 3.8647E−01 | 4.1079E−01 | −1.2893E+00 | −1.9781E−01 | 5.8242E−01 | 5.9071E−03 |
| A6: | −5.3816E+01 | −6.9747E+00 | 9.0844E−01 | −2.1376E+00 | −5.3947E−01 | 6.4507E−01 |
| A8: | 1.2103E+03 | 6.3692E+01 | 1.0998E+02 | 1.5038E+01 | −2.2360E−01 | −2.0498E+00 |
| A10: | −1.5206E+04 | −1.9813E+02 | −7.7747E+02 | −4.3836E+01 | 4.9685E−01 | 2.3596E+00 |
| A12: | 9.8941E+04 | 1.2478E+01 | 2.2503E+03 | 6.0617E+01 | 4.0492E−02 | −1.0034E+00 |
| A14: | −2.6148E+05 | 6.4976E+02 | −2.5298E+03 | −3.2932E+01 | −1.6200E−01 | 7.8511E−02 |

In the ninth embodiment, the equation of the aspheric surface profiles of the aforementioned lenses is the same as the equation of the first embodiment. Also, the definitions of these parameters shown in the following table are the same as those stated in the first embodiment with corresponding values for the ninth embodiment, so an explanation in this regard will not be provided again.

Moreover, these parameters can be calculated from Table 17 and Table 18 as the following values and satisfy the following conditions:

| Embodiment 9 | | | |
|---|---|---|---|
| f[mm] | 1.13 | f2/CT2 | 6.21 |
| Fno | 1.74 | CT1/CT2 | 0.91 |
| FOV[deg.] | 81.0 | CT3/CT2 | 2.36 |
| EPD[mm] | 0.65 | TD/T23 | 69.92 |
| R1/(sin(HFOV)*f) | −5.12 | f1/f2 | 0.43 |
| FOV/f [*/mm] | 71.97 | f1/f3 | 0.42 |
| R2/R3 | 1.80 | f/f2 | 0.33 |
| R1/R5 | −0.82 | SD/TL | 0.76 |
| R1/EPD | −5.77 | R2/R6 | 0.20 |
| R5/EPD | 7.06 | CT3/R5 | 0.15 |
| R1*(TL/f) [mm] | −9.34 | TD/TL | 0.75 |
| f2/f3 | 0.99 | CT2/TL | 0.20 |
| f3/EPD | 5.35 | BFL/TL | 0.25 |
| TD/f | 1.86 | CT2/CT3 | 0.81 |

Figure 10:
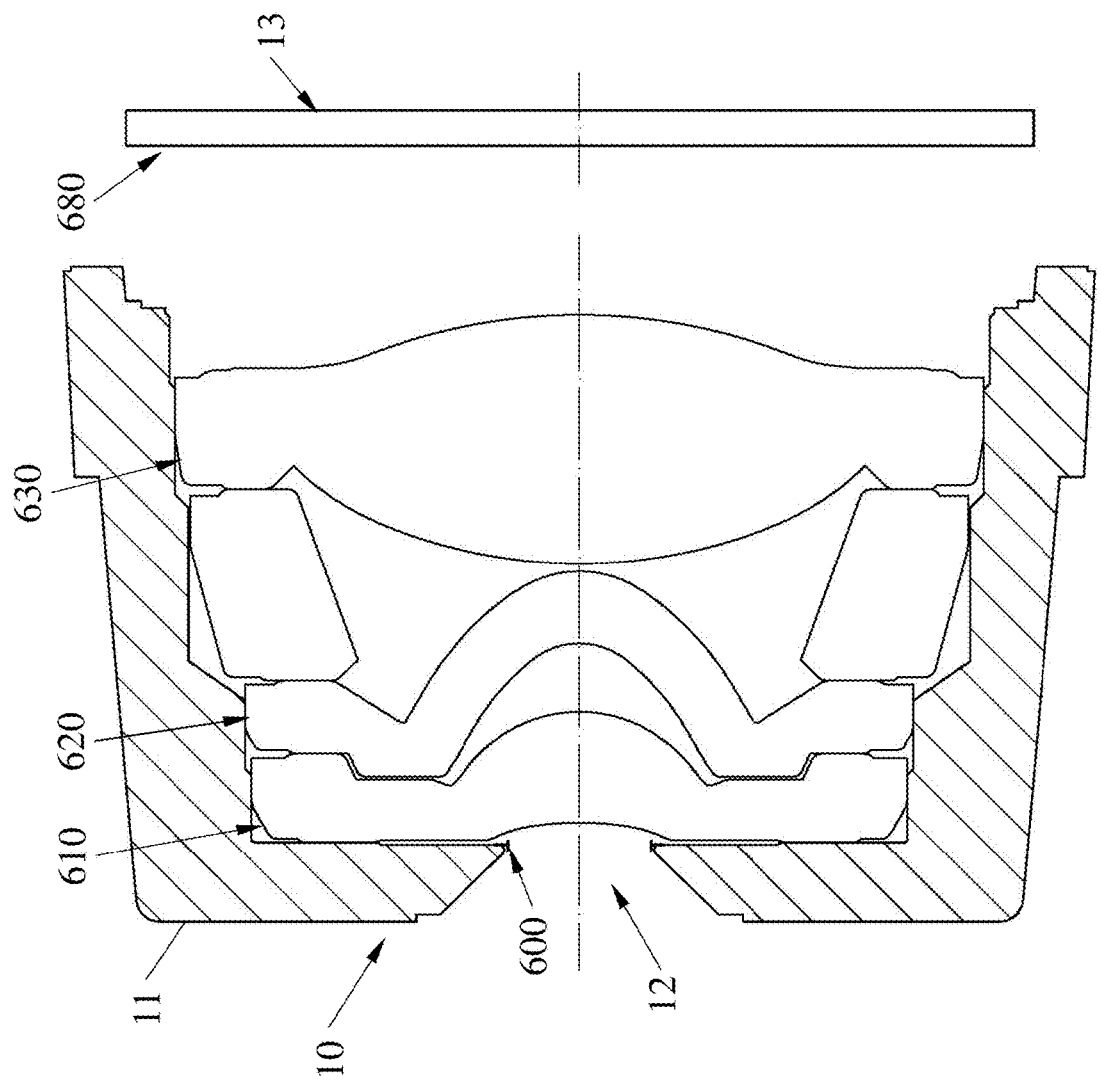
FIG. 10 shows an infrared projection module in accordance with a tenth embodiment of the present invention.

Referring to FIG. 10, which shows an infrared projection module in accordance with a tenth embodiment of the present invention, the infrared projection module is applied to a notebook, but not limited to this, digital carriers, such as, tablet computer, mobile phone and so on, are available. The infrared projection module 10 includes a lens barrel 11, an infrared projection lens assembly 12 and a light source 13. The infrared projection lens assembly 12 is the infrared projection lens assembly of the above sixth embodiment, but not limited to this, and can also be the infrared projection lens assemblies of the other embodiments. In addition, the lenses of the infrared projection lens assembly in FIG. 10 show the unlit peripheral parts, which is slightly different from that of the sixth embodiment. The infrared projection lens assembly 12 is disposed in the lens barrel 11. The light source 13 is disposed on the image source plane 680 of the infrared projection lens assembly 12.

In the present infrared projection lens assembly, the lenses can be made of plastic or glass. If the lenses are made of plastic, the cost will be effectively reduced. If the lenses are made of glass, there is more freedom in distributing the refractive power of the infrared projection lens assembly. Plastic lenses can have aspheric surfaces, which allow more design parameter freedom (than spherical surfaces), so as to reduce the aberration and the number of the lenses, as well as the total length of the infrared projection lens assembly.

In the present infrared projection lens assembly, if the image-side surface or the image source-side surface of the lenses with refractive power is convex and the location of the convex surface is not defined, the image-side or the image source-side surface of the lenses near the optical axis is convex. If the image-side or the image source-side surface of the lenses is concave and the location of the concave surface is not defined, the image-side or the image source-side surface of the lenses near the optical axis is concave.

The infrared projection lens assembly of the present invention can be used in focusing optical systems and can obtain better image quality. The infrared projection lens assembly of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. An infrared projection lens assembly, comprising a stop and three lenses, in order from an image side to an image source side, comprising:

the stop;

a first lens with positive refractive power, comprising an image-side surface and an image source-side surface, the image-side surface of the first lens being concave near an optical axis and the image source-side surface of the first lens being convex near the optical axis, and the image-side surface and the image source-side surface of the first lens being aspheric;

a second lens with refractive power, comprising an image-side surface and an image source-side surface, the image-side surface of the second lens being concave near the optical axis and the image source-side surface of the second lens being convex near the optical axis, and the image-side surface and the image source-side surface of the second lens being aspheric; and a third lens with positive refractive power, comprising an image-side surface and an image source-side surface, the image-side surface of the third lens being convex near the optical axis and the image source-side surface of the third lens being convex near the optical axis, and the image-side surface and the image source-side surface of the third lens being aspheric;

wherein a radius of curvature of the image-side surface of the first lens is R1, half of a maximum view angle (field of view) of the infrared projection lens assembly is HFOV, a focal length of the infrared projection lens assembly is f, a focal length of the second lens is f2, and following conditions are satisfied: −18.2<R1/(sin (HFOV)*f)<−1.53 and −0.22<f/f2<0.40, wherein the ratio f/f2 must not be equal to zero.

2. The infrared projection lens assembly as claimed in claim 1, wherein the infrared projection lens assembly has the maximum view angle (field of view) FOV, the focal length of the infrared projection lens assembly is f, and following condition is satisfied: 22.93°/mm<FOV/f<94.42°/mm.

3. The infrared projection lens assembly as claimed in claim 1, wherein a radius of curvature of the image source-side surface of the first lens is R2, a radius of curvature of the image-side surface of the second lens is R3, and following condition is satisfied: 1.05<R2/R3<3.54.

4. The infrared projection lens assembly as claimed in claim 1, wherein the radius of curvature of the image-side surface of the first lens is R1, a radius of curvature of the image-side surface of the third lens is R5, and following condition is satisfied: −8.26<R1/R5<−0.20.

5. The infrared projection lens assembly as claimed in claim 1, wherein the radius of curvature of the image-side surface of the first lens is R1, an entrance pupil diameter of the infrared projection lens assembly is EPD, and following condition is satisfied: −14.34<R1/EPD <−1.88.

6. The infrared projection lens assembly as claimed in claim 1, wherein a radius of curvature of the image-side surface of the third lens is R5, an entrance pupil diameter of the infrared projection lens assembly is EPD, and following condition is satisfied: 1.39<R5/EPD <11.95.

7. The infrared projection lens assembly as claimed in claim 1, wherein the radius of curvature of the image-side surface of the first lens is R1, a distance from the image-side surface of the first lens to an image plane along the optical axis is TL, the focal length of the infrared projection lens assembly is f, and following condition is satisfied: −28.34 mm<R1(TL/f)<−2.80 mm.

8. The infrared projection lens assembly as claimed in claim 1, wherein a focal length of the second lens is f2, a focal length of the third lens is f3, and following condition is satisfied: −25.66<f2/f3<11.31, wherein the ratio f2/f3 must not be equal to zero.

9. The infrared projection lens assembly as claimed in claim 1, wherein a focal length of the third lens is f3, an entrance pupil diameter of the infrared projection lens assembly is EPD, and following condition is satisfied: 1.45<f3/EPD <6.42.

10. The infrared projection lens assembly as claimed in claim 1, wherein a distance from the image-side surface of the first lens to the image source-side surface of the third lens along the optical axis is TD, the focal length of the infrared projection lens assembly is f, and following condition is satisfied: 1.16<TD/f<2.29.

11. The infrared projection lens assembly as claimed in claim 1, wherein a focal length of the second lens is f2, a central thickness of the second lens along the optical axis is CT2, and following condition is satisfied: −143.51<f2/CT2<69.94, wherein the ratio f2/CT2 must not be equal to zero.

12. The infrared projection lens assembly as claimed in claim 1, wherein a central thickness of the third lens along the optical axis is CT3, the central thickness of the second lens along the optical axis is CT2, and following condition is satisfied: 0.79<CT3/CT2<2.83.

13. The infrared projection lens assembly as claimed in claim 1, wherein a distance from the image-side surface of the first lens to the image source-side surface of the third lens along the optical axis is TD, a distance from the image source-side surface of the second lens to the image-side surface of the third lens along the optical axis is T23, and following condition is satisfied: 44.10<TD/T23<147.24.

14. The infrared projection lens assembly as claimed in claim 1, wherein a central thickness of the first lens along the optical axis is CT1, a central thickness of the second lens along the optical axis is CT2, and following condition is satisfied: 0.47<CT1/CT2<1.85.

15. An infrared projection module, comprising:
a lens barrel,
an infrared projection lens assembly disposed in the lens barrel, and a light source disposed on an image source plane of the infrared projection lens assembly,
wherein the infrared projection lens assembly, comprising a stop and three lenses, in order from an image side to an image source side, comprising:
the stop;
a first lens with positive refractive power, comprising an image-side surface and an image source-side surface, the image-side surface of the first lens being concave near an optical axis and the image source-side surface of the first lens being convex near the optical axis, and the image-side surface and the image source-side surface of the first lens being aspheric;
a second lens with refractive power, comprising an image-side surface and an image source-side surface, the image-side surface of the second lens being concave near the optical axis and the image source-side surface of the second lens being convex near the optical axis, and the image-side surface and the image source-side surface of the second lens being aspheric; and
a third lens with positive refractive power, comprising an image-side surface and an image source-side surface, the image-side surface of the third lens being convex near the optical axis and the image source-side surface of the third lens being convex near the optical axis, and the image-side surface and the image source-side surface of the third lens being aspheric;
wherein a radius of curvature of the image-side surface of the first lens is R1, half of a maximum view angle (field of view) of the infrared projection lens assembly is HFOV, a focal length of the infrared projection lens assembly is f, a focal length of the second lens is f2, and following conditions are satisfied: −18.2<R1/(sin (HFOV)*f)<−1.53 and −0.22<f/f2<0.40, wherein the ratio f/f2 must not be equal to zero.

16. The infrared projection module as claimed in claim 15, wherein the infrared projection lens assembly has the maximum view angle (field of view) FOV, the focal length of the infrared projection lens assembly is f, and following condition is satisfied: 22.93°/mm<FOV/f<94.42°/mm.

17. The infrared projection module as claimed in claim 15, wherein the radius of curvature of the image-side surface of the first lens is R1, a radius of curvature of the image-side surface of the third lens is R5, and following condition is satisfied: −8.26<R1/R5<−0.20.

18. The infrared projection module as claimed in claim 15, wherein the radius of curvature of the image-side surface of the first lens is R1, an entrance pupil diameter of the infrared projection lens assembly is EPD, and following condition is satisfied: −14.34<R1/EPD <−1.88.

19. The infrared projection module as claimed in claim 15, wherein the radius of curvature of the image-side surface of the first lens is R1, a distance from the image-side surface of the first lens to an image plane along the optical axis is TL, the focal length of the infrared projection lens assembly is f, and following condition is satisfied: −28.34 mm<R1 (TL/f)<−2.80 mm.

20. The infrared projection module as claimed in claim 15, wherein a focal length of the second lens is f2, the central thickness of the second lens along the optical axis is CT2, and following condition is satisfied: −143.51<f2/CT2<69.94, wherein the ratio f2/CT2 must not be equal to zero.

\* \* \* \* \*